United States Patent
Tokunaga et al.

(10) Patent No.: US 6,745,459 B2
(45) Date of Patent: Jun. 8, 2004

(54) HEAT EXCHANGING TUBE ASSEMBLING APPARATUS FOR HEAT EXCHANGER AND ASSEMBLING METHOD THEREOF

(75) Inventors: Yoshiharu Tokunaga, Yokohama (JP); Tadashi Washizuka, Kawasaki (JP); Shoichi Okisawa, Yokohama (JP); Takio Ichimura, Avase (JP); Motomu Ito, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 10/112,326

(22) Filed: Apr. 1, 2002

(65) Prior Publication Data

US 2002/0104215 A1 Aug. 8, 2002

Related U.S. Application Data

(62) Division of application No. 09/429,473, filed on Oct. 29, 1999, now Pat. No. 6,389,682, which is a division of application No. 08/908,162, filed on Aug. 7, 1997, now Pat. No. 5,996,217.

(30) Foreign Application Priority Data

Aug. 7, 1996 (JP) .......................................... P.8-208281

(51) Int. Cl.[7] ................................................ B23P 15/26
(52) U.S. Cl. ................... 29/726.5; 29/726; 29/890.038; 29/890.04; 414/745.3
(58) Field of Search .............................. 29/726, 726.5, 29/890.038, 890.04; 414/745.1, 745.3, 746.7

(56) References Cited

U.S. PATENT DOCUMENTS

| | | | |
|---|---|---|---|
| 3,567,044 A | 3/1971 | Travis | 29/726 |
| 3,867,752 A | 2/1975 | Tachibana et al. | 29/726 |
| 4,104,790 A * | 8/1978 | Hindrichs | |
| 4,221,534 A | 9/1980 | Rethy | 414/745 |
| 4,380,868 A | 4/1983 | Hall | 29/726 |
| 4,543,711 A | 10/1985 | Wada et al. | 29/726 |
| 4,547,963 A | 10/1985 | Ohmstede | 29/726 |
| 4,625,396 A | 12/1986 | Ahmed et al. | 29/726 |
| 4,747,208 A * | 5/1988 | Sbalchiero et al. | |
| 5,228,191 A | 7/1993 | Casterline | 29/726 |
| 5,427,490 A * | 6/1995 | Tokiwa et al. | |
| 6,389,682 B1 * | 5/2002 | Tokunaga et al. | |

FOREIGN PATENT DOCUMENTS

| JP | 51-115199 | * 10/1976 |
|---|---|---|
| JP | 60-096338 | * 5/1985 |
| JP | 63-282027 | * 11/1988 |

* cited by examiner

Primary Examiner—David P. Bryant
Assistant Examiner—Eric B Compton
(74) Attorney, Agent, or Firm—Oblon, Spivak, McClelland, Maier & Neustadt, P.C.

(57) ABSTRACT

A heat exchanging tube assembling apparatus is adapted to a heat exchanger having an outer casing in which is arranged a partition plate formed with holes through which heat exchanging tubes, each having a U-shape in outer appearance, are inserted from an open end side of the casing in a full automatic manner. The heat exchanging tube assembling apparatus includes a tube grasping device for grasping a plurality of U-shaped tubes in a group at a working position, a tube positioning device for positioning the grasped tubes to positions from which the U-shaped tubes are inserted into the holes formed to the partition plate, a tube taking-out device for sequentially taking out one by one the U-shaped tubes grasped by the tube grasping device, and a tube feed device for feeding the taken-out tubes toward the partition plate and inserting the tubes into the holes of the partition plate.

2 Claims, 19 Drawing Sheets

HEAT EXCHANGING TUBE ASSEMBLING APPARATUS FOR HEAT EXCHANGER AND ASSEMBLING METHOD THEREOF

This application is a Division of application Ser. No. 09/429,473 now U.S. Pat. No. 5,389,682 Filed on Oct. 29, 1999 which is a Division of application Ser. No. 08/908,162 filed on Aug. 7, 1997, now U.S. Pat. No. 5,996,217.

BACKGROUND OF THE INVENTION

1. Field of the Invention

The present invention relates to an apparatus and method of assembling a heat exchanging tube for a heat exchanger capable of automatically assembling heat exchanging tubes, which serve as heating tubes, cooling tubes or the like, applied to a heat exchanger (for example, a feed water heater, a boiler, a humidity separating and heating unit, a ground steam evaporator, and a cooling unit for cooling cooling water, condensed water, oil or the like) which is provided with thermal power generation plants, nuclear power generation plants and the like as an accessory.

An example of a prior art device will be first described with reference to FIG. 19 and FIG. 20. This example relates to an assembly of heat exchanging tubes as heating tubes in a horizontal type feed water heater used in thermal power generation plants, nuclear power generation plants and the like.

FIG. 19 schematically shows how the tubes are assembled to the feed water heater. The feed water heater is generally composed of a cylindrical frame 1 in which are accommodated a multiplicity of U-shaped tubes 2 called heating tubes into which circulating water flows and a tube bundle is formed by the tubes. The respective tubes 2 are assembled by being inserted into the holes 4 of a plurality of partitions 3 disposed in parallel with each other from an open end side with the U-shaped curved portions of the tubes 2 on a bent end side directed longitudinally.

As shown in FIG. 19, the tubes 2 are assembled in such a manner that the base portion 1a of the cylindrical frame 1 is fixed on a height adjustment table 5 as well as the partitions 3 are positioned at a predetermined height by a support table 6 and the tubes 2 are sequentially inserted into the holes 4 of the partitions 3 by the hand work of five to eight workers. After all the tubes 2 are inserted into the holes 4 of the partitions 3, a cylindrical barrel 1b is combined with and welded to the base portion 1a of the cylindrical frame 1 to thereby complete a heat exchanger.

FIG. 20 shows a plan view of the partition 3 described above, FIG. 21 shows the state that the tubes 2 are inserted into the partitions 3 in an enlarged fashion and FIG. 22 shows a side surface shape of the tube 2. As shown in these drawings, the tube bundle is composed to 1000 to 3000 pieces of the tubes 2 in which the tube whose U-shaped curved portion on the bent end side has a minimum radius R is disposed at the center of the partition 3 and both the side portions of the tubes whose U-shaped curved portion has a larger radius R are sequentially disposed above and below the tube (CL in FIG. 21 shows a gap between a first stage and a second stage). In this case, since the tube 2 having a larger radius R covers the end portion of the tube 2 having a smaller radius R on the bent end side, the tube having the smaller radius R is inserted into the partitions 3 first and thereafter the tubes 2 having the larger radius R are sequentially assembled in a usual assembling process for inserting the tubes 2 from the open end side. Conventionally, an assembly job for assembling all the tubes 2 is regularly carried out from the tubes having the smaller radius R to the tubes having the larger radius R according to the above process.

An assembling method according to the above process will be described with reference to FIG. 19. In general, the tubes 2 are separately accommodated in a plurality of packing cases 7 after they are finished. Thus, all the packing cases 7 are piled up with the packing case 7 in which the tubes 2 whose U-shaped curved portion has a minimum radius R are accommodated disposed at an uppermost stage. Thereafter, each of the packing cases 7 is sequentially placed on a work table 8 in the order of the case located on an upper stage to the case located on a lower stage, a lid 7a on the upper surface of the packing case 7 is removed and then all the tubes 2 are lifted and taken out from the packing case 7 using a not shown crane, a hoist beam, a plurality of nylon strings and the like and placed on skids 9 placed on the packing case 7 and the dirt at the extreme ends of the tubes 2 are wiped out.

Thereafter, the five to eight workers lift up the tubes 2 on the skids 9 one by one and align the open ends of the tubes 2 with the holes 4 of the partition 3 and support and insert the tubes 2 while walking and the rearmost worker pushes the tube 2 until the bent end side thereof is fallen into the predetermined place of the partition 3. Before the rearmost worker finishes the pushing job, the foremost worker goes to a rear side and make preparation for the next job by taking up the next tube 2. Thereafter, the tubes 2 of the same radius R are sequentially assembled by the repetition of the above process.

On the completion of the insertion and assembly of the tubes 2 prepared on the skids 9, the tubes 2 of the same type are lifted by the crane, the lift beam, the nylon strings and the like and taken out onto the skids 9 again and the dirt at the extreme ends thereof are wiped out and thereafter jobs similar to the above jobs are carried out.

When the assembly of the tubes 2 having the minimum radius R to the first stage of the holes at the center of the partitions 3 is completed by the repetition of the above jobs, a necessary number of packing cases 7 which accommodate the tubes 2 corresponding to the second stages of the holes located above and below the first stage are prepared and the same jobs are repeated. Thereafter, a predetermined number of the tubes 2 are inserted into the holes 4 of the partitions 3 in the predetermined stages in the order of an odd stage and an even stage by the repetition of the same jobs. At that time, since a gap is necessary to take out the packing cases 7 accommodating the tubes 2 for respective stages, the tubes 2 for the odd stages and tubes 2 for the even stages are separately accommodated in the packing cases 7.

The tube 2 has a length of, for example, about 11 meters and is formed to have a slender shape with a diameter D of about 20 millimeters. Thus, when there are a smaller number of support points, the job for inserting the tube 2 is difficult because the tube 2 is liable to be bent in such a case. Accordingly, there are conventionally required a large number of workers. Further, when the tubes 2 accommodated in the packing case 7 are taken out one by one, it is become difficult to take out the tubes 2 remaining in the packing case 7 because they collapse in the packing case 7. To cope with this problem, a necessary number of the tubes 2 must be previously taken out on the packing case 7, which requires an additional setup job before the insertion of the tubes.

The tubes 2 are regularly disposed in the feed water heater in the order of the tubes 2 having the minimum radius R to the tubes 2 having the maximum radius R as shown in FIGS.

20 to 22. However, since the tubes 2 must be sequentially inserted from the tubes 2 having a smaller radius R due to the characteristics of the U-shape as described above, a multiplicity of the packing cases 7 accommodating the tubes 2 of the same radius R must be prepared. When the tubes 2 having a different radius R are accommodated in the same packing case 7 to enhance the accommodating efficiency of the packing case 7, there arises a disadvantage of the tube 2 having, for example, a small radius and which is taken out from the packing case 7 midway in the above process and the opened packing case 7 must be moved to a different position and temporarily placed there. At the same time, since all the packing cases 7 in which the necessary tubes 2 are accommodated must be opened, a large space is required to temporarily place the opened packing cases.

Further, since the tubes 2 must be conveyed from the packing cases 17 disposed as described above to the work table 8, the work for lifting them by the crane or the like is increased as well as when the crane is used for other work, the tube conveying job must be interrupted. As described above, the assembly of the heat exchanging tubes in heat exchanger executed by the prior art method has various problems such that the tubes are inefficiently assembled because a large number of workers are required and many complicated manual jobs are necessary and the space in which the packing cases are disposed is increased.

SUMMARY OF THE INVENTION

An object of the present invention is to substantially eliminate defects or drawbacks encountered in the prior art described above and to provide an apparatus and method of assembling a heat exchanging tube in a heat exchanger by which the number of workers can be reduced, complicated manual jobs can be decreased, the working efficiency can be increased and the space in which packing cases are disposed can be reduced in addition to the tubes being securely and easily inserted.

This and other objects can be achieved according to the present invention by providing, in one aspect, a heat exchanging tube assembling apparatus for a heat exchanger having an outer casing in which is arranged partition plate means formed with holes through which heat exchanging tubes, each having a U-shape in an outer appearance, are inserted from an open end side of the casing in a full automatic manner, the heat exchanging tube assembling apparatus comprising:

tube grasping means for grasping a plurality of U-shaped tubes in a lump at a working position;

tube positioning means for positioning the grasped tubes to positions from which the U-shaped tubes are inserted into the holes formed to the partition plate means;

tube taking-out means for sequentially taking out one by one the U-shaped tubes grasped by the tube grasping means; and tube feeding means for feeding the taken-out tubes toward the partition plate means and inserting the tubes into the holes of the partition plate means.

In preferred embodiments, the heat exchanging tube assembling apparatus further comprises a tube accommodating means in which a plurality of U-shaped tubes are accommodated and a tube mounting means on which the tube accommodating means are mounted and which is disposed to the working position. The tube accommodating means is a tube packing case which accommodates the U-shaped tubes lengthily in a lateral direction while keeping U-shaped curved portions of the tubes on bent end sides horizontally and which is opened upward and a plurality of types of the U-shaped tubes including U-shaped curved portions having different radii are disposed from an inside to an outside of the packing case in a plane and the U-shaped tubes whose curved portions have the same radius are piled up, respectively. The tube packing case is provided with load shift preventing tube spacers which are long in a lengthwise direction and are intermittently disposed as a fall-down preventing structure in the tube packing case in the lengthwise direction of the tubes to thereby section the respective tubes whose U-shaped curved portions have different radii.

The heat exchanging tube assembling apparatus further comprises rail means disposed on a floor on which the heat exchanging tube assembling apparatus is disposed and a pair of L-shaped frame members which are disposed to be movable on the guide means and by which the tube grasping means, the tube taking-out means and the tube feed means are supported through horizontal arms. The heat exchanging tube assembling apparatus further comprises a tube taking-out portion support arm disposed to be perpendicular to the horizontal arms on a horizontal plane at extreme ends of the horizontal arms and the tube grasping means and the tube taking-out means are supported to be rotatable by the taking-out portion support arm. The tube positioning means for setting the tubes at a position where the tubes are inserted by moving the tube horizontally and vertically and turning the U-shaped tubes about a horizontal axis thereof is composed of the pair of L-shaped frame members, the respective horizontal arms supported by the L-shaped frame members to be movable upward and downward, the taking-out portion support arm and a reversing beam turnably provided to the taking-out portion support arm.

The tube grasping means and the tube taking-out means constitute a set of a tube taking-out unit in operative combination thereof and a plurality sets of the tube taking-out units are disposed with an interval along a longitudinal direction of the taking-out portion support arm.

The tube grasping means and the tube taking-out means constitute a set formed of a tube taking-out unit in operative combination thereof and a plurality of sets of the tube taking-out units which are disposed with an interval along a longitudinal direction of the taking-out portion support arm.

The tube feeding means includes a base, a roller support frame supported by the base to be movable upward and downward, a guide roller supported by the roller support frame and receiving the extreme end of the tube through a reciprocation of the guide roller along the tube inserting direction, and feeding drive rollers and follower rollers which are disposed downstream of the tube inserting direction of the guide roller of the roller support frame and rotated so as to clamp the tube to thereby feed the tube to the partition plate means of a heat exchanger.

The tube feeding means includes an introduction mechanism having an air chuck for introducing the tube from the tube taking-out means to the positions of the drive rollers and the follower rollers through the reciprocating movement thereof in the tube inserting direction together with or in place of the guide rollers. The tube feeding means includes a cylinder unit for pushing the U-shaped bent end side of the tube to the side of the partition plate means. The tube feeding means may further include a force gauge provided to the cylinder unit for pushing the bent end of the U-shaped tube.

A taper-shaped cap having a sharp extreme end is mounted to an open end side of the U-shaped tube and a guide member is provided to a lower portion of the hole formed to the partition plate means so as to guide the cap into the hole.

The tube grasping means includes self-determination means for automatically determining a position where a subsequent tube is grasped and taken out the subsequent tube in accordance with a position at which an initial tube is grasped and taken out at a tube grasping position.

The tube feeding means includes control means for self-determining a position where the tube is inserted into the hole of the partition plate means in accordance with a work data to thereby automatically determine the position where the respective tubes are inserted.

The tube grasping means, the tube positioning means, the tube taking-out means and the tube feeding means include operation sections, respectively, and at least one of the operation sections is provided with an element for achieving an abnormal load detecting function, an abnormal load automatic avoiding function or an emergency stop function.

The tube feeding means includes a speed detection means for detecting an operating speed of a tube to be fed therefrom.

According to the present invention, there is provided, in another aspect, a heat exchanging tube assembling method for a heat exchanger having an outer casing in which is arranged partition plate means formed with holes through which heat exchanging tubes, each having a U-shape in an outer appearance, are inserted from an open end side of the casing in a full automatic manner, the heat exchanging tube assembling method comprising the steps of:

taking out each predetermined number of the U-shaped tubes disposed in an accommodation place;

stocking the taken-out tubes to a stock position sequentially at a predetermined inserting portion from which the tubes are inserted into the holes of the partition plate means; and sequentially taking out the stocked tubes from the stock position one by one and inserting the tube into the holes of the partition plate means, thus assembling the heat exchanging tubes in a predetermined fashion.

In the preferred example in this aspect, the U-shaped tubes includes a plurality of groups thereof having curved portions of different radii from each other, and the holes of the partition plate means are formed into a plurality of groups divided so as to correspond to the groups of the U-shaped tubes so that the tube groups are inserted into corresponding groups of the holes, the U-shaped tubes having different radii being disposed inside to outside in a horizontal plane and having the same radius being piled vertically in the the accommodation place and after all the tubes belonging to one group are inserted into the corresponding holes, the setup of a next group U-shaped tubes is achieved.

When the U-shaped tubes are taken out from the accommodation place, the U-shaped curved portions of the tubes on the bent end side are kept horizontally, the U-shaped curved portions are kept vertical at the position where the tubes are stocked and respective groups of the tubes whose U-shaped curved portions each has a smaller radius are sequentially inserted into the holes of the partition plate means. A plurality of heat exchangers are disposed in parallel with each other and the tubes are assembled to the heat exchangers in parallel or sequential manner. The U-shaped tubes are disposed in a packing case in which the U-shaped tubes having different radii are disposed and the packing case is introduced to a working portion and removed therefrom by using a conveyer.

In further aspects, there is provided a heat exchanging tube feed apparatus for a heat exchanger for taking out one by one a plurality of heat exchanging tubes each having a U-shape in an outer appearance and arranged in parallel with each other and feeding the tubes in one direction, comprising:

pushing means for pushing out the heat exchanging tubes;

a push-out cylinder for driving the push means for pushing out the heat exchanging tubes;

a grooved roller supporting one tube positioned to a lower side of the tubes from a lower side thereof;

a link mechanism supporting the grooved roller; and cylinder means for driving the link mechanism vertically and horizontally and taking out sideway the tube supported by the grooved roller.

The grooved roller for supporting the tube from the lower side thereof and the link mechanism for supporting the grooved roller are supported to be rotatable by a shaft at a tube taking-out position and usually disposed at the tube taking-out position by a spring and when a U-shaped curved portion of the U-shaped tube passes at the tube insertion time, the grooved roller and the link mechanism are operated to escape in a tube inserting direction through the shaft.

A heat exchanging tube feed apparatus for a heat exchanger for feeding out the heat exchanging tube, received at a predetermined position, in one direction, comprising:

a base;

a roller support frame supported by the base to be movable upward and downward;

a guide roller supported by the roller support frame and receiving an extreme end of the tube through a reciprocation of the guide roller along the tube inserting direction; and drive rollers and follower rollers which are disposed downstream of the tube inserting direction of the guide roller of the roller support frame and rotated so as to clamp the tube to thereby feed the tube to the heat exchanger.

The heat exchanging tube feeding apparatus may further comprise an introduction mechanism having an air chuck for introducing the tube to positions of the drive rollers and the follower rollers through reciprocating movement thereof in the tube inserting direction together with or in place of the guide rollers.

A heat exchanging tube feed apparatus for a heat exchanger for feeding the heat exchanging tube, received at a predetermined position, in one direction may comprise a speed detection means for detecting an operation speed of the tube to be fed.

According to the embodiment of the present invention of the structures and characters described above, the following functions and advantageous effects will be attained.

Conventionally, when a job which is executed using a crane is needed in a heat exchanging tube assembly job, since the tube assembly job depends on how other jobs are proceeded, there is a possibility that an idle time is caused to the tube assembly job itself According to the embodiment, however, such an adverse affect does not arise and working time can be saved because of the automatic assembling operation. Further, since the tube grasping means, which can directly take out a necessary number of the tubes from the tube accommodation means such as packing case is provided for the assembling apparatus, a hanging-down job by a crane is not necessary while the tubes are inserted. Thus, a job using the crane can be minimized and a working process can be also shortened.

Since the two packing cases are loaded on the mounting member, the tubes to be accommodated therein can be packed by being separated to those used to odd stages and those used to even stages and thus the tubes for the alternate stages can be accommodated in the same case. Regardless of this arrangement, the gaps between the respective tubes are very narrow and further since the tubes are long, they are irregularly disposed in a lengthwise direction and the gaps are greatly dispersed. Since the tube grasping means is provided with a function which enters the narrow portions and shoves the tubes and a tube lifting mechanism to cope with this problem, the tubes can be naturally taken out from the packing case.

Since the tubes have a small diameter and a long entire length, when the tubes left in a piled-up state are lifted up, they are liable to cause a load shift. Whereas, since the support arm is added to the hanger as a countermeasure for preventing the load shift in the tube grasping means, when the tube grasping means is provided with a multiplicity of units having the same mechanism, such can reduce the load applied on a single unit, such that the size of the unit itself can be reduced.

Since the base portion of the apparatus is arranged as the cantilever arm type by the employment of the L-shaped frames, the packing case can be set up in the state that one side of the apparatus is opened. Thus, the frames do not obstruct operation and space can be saved. As to the inserting job of the tubes, the tubes which have been taken out and placed at a stock position can be securely taken out one by one by the tube taking-out means and effectively and securely inserted by the tube feed-out means and the insertion of the tubes can be securely completed. Further, since the apparatus of the embodiment can be divided into several units, the apparatus can be accommodated by being divided into the units when it is not used, by which a storing space can be minimized.

According to the method of the present invention, the tube assembly job can be carried out in a necessary minimum space in such a manner that after the tubes accommodated in a necessary minimum number of the packing cases are inserted into all the holes of the partition plates, the setup of the packing cases is changed and the tubes in the next packing cases are assembled. Since a portion of the mechanisms can retract when the tube is fed to the partition plates, even if the U-shaped curved portion at the rear end of the tube is fed during tube inserting, feeding of the tube is free from obstruction by retracting the mechanisms. Thus, the tube insertion job can be smoothly carried out.

Further, since there is provided the control mechanism which determines the position where the tube is inserted by itself based on workpiece data previously input to move and feed the tube, the control mechanism can determine the position of the next tube from the position of the tube fetched first and take out the tube. In addition, since the function for detecting an abnormal load, the occurrence of an accident can be previously prevented and safety can be improved.

The nature and further characteristic features of the present invention will be made more clear from the following descriptions with reference to the accompanying drawings.

DESCRIPTION OF THE PREFERRED EMBODIMENT

An embodiment of a heat exchanging tube assembling apparatus and method of the present invention will be described hereunder with reference to the accompanying drawings. Further, it is to be noted that the embodiment explains a case that the present invention is applied to an assembly of tubes serving as the heating tubes of a feed water heater in a power generation plant.

First, a main arrangement of the heat exchanging tube assembling apparatus and the assembling method using the apparatus will be described with reference to FIGS. 1 to 5.

Figure 1:
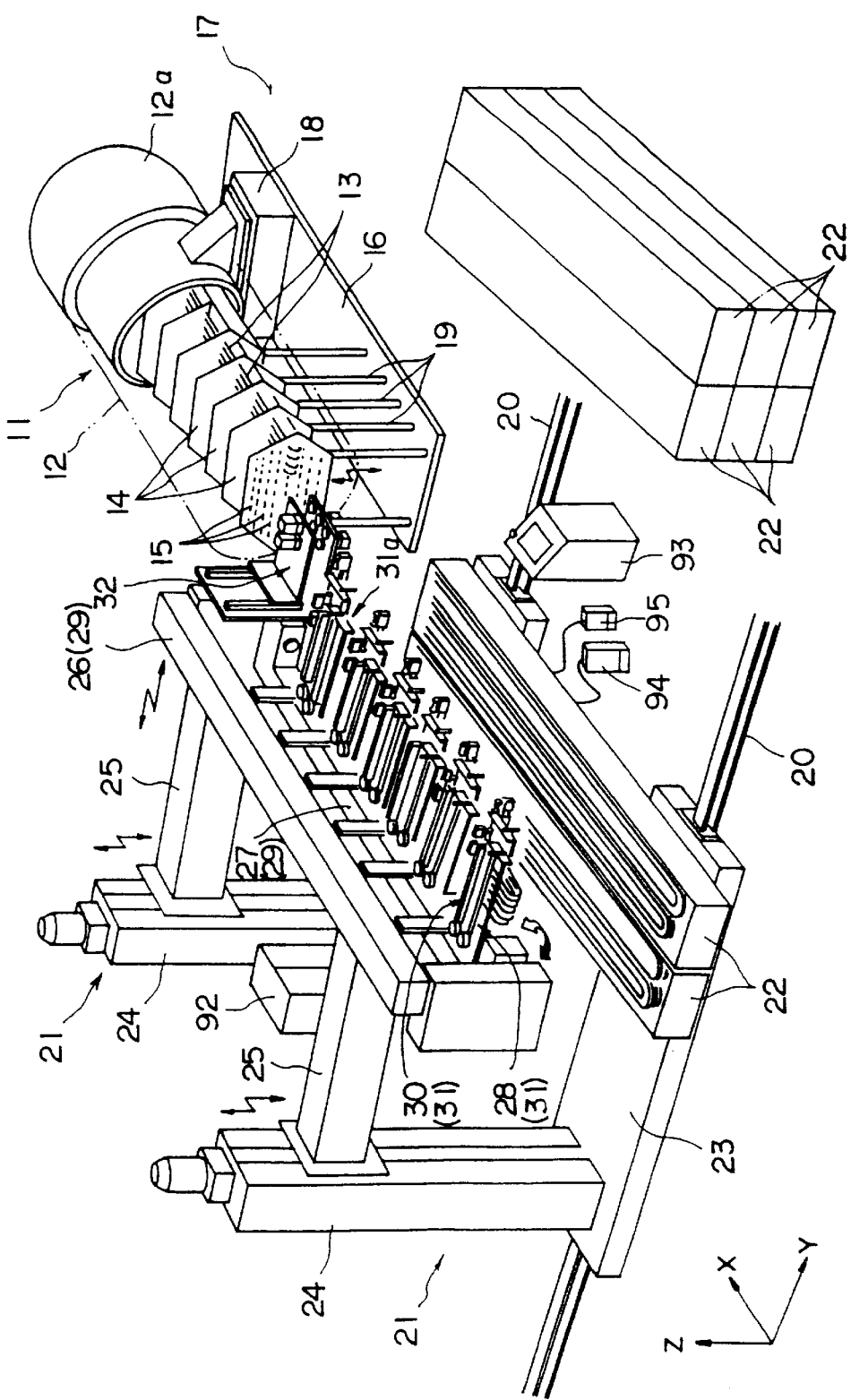
FIG. 1 is a view showing an overall arrangement of a heat exchanging tube assembling apparatus for a heat exchanger according to one embodiment of the present invention.

As shown in FIG. 1, a feed water heater 11 as a subject of the embodiment is composed of a cylindrical frame 12 in which accommodated are a multiplicity of U-shaped tubes 13 as heating tubes into which circulating water flows and a tube bundle is formed by the tubes 13. The respective tubes 13 are assembled by being inserted into the holes 15 of a plurality of partitions 14 disposed in parallel with each other from an open end side with the U-shaped curved portions of the tubes 13 on a bent end side directed longitudinally.

In the embodiment, the base portion 12a of the cylindrical frame 12 constituting the feed water heater 11 and the plurality of partitions 14 into which the tubes 13 are inserted are placed on a working truck 16 and can move on a floor 17. The base portion 12a of the cylindrical frame 12 is placed on the working truck 16 through a height adjustment table 18, the respective partitions 14 are fixed onto the working truck 16 by not shown bolts or the like through supporters 19, and the height of the base portion 12a of the cylindrical frame 12 can be adjusted by the height adjustment table 18 so that it conforms to the height of the tube inserting holes 15 of the of the partitions 14.

The tube assembling apparatus of the embodiment for inserting the tubes 13 into the partitions 14 of the feed water heater 11 is composed of an apparatus main body having a pair of L-shaped parallel frames 21 capable of moving on guide rails 20 disposed on the floor 17 and tube accommodating packing cases 22 for supplying the tubes 13 to the apparatus main body. The guide rails 20 are disposed in a direction (Y-direction) which is perpendicular to a tube inserting direction (X-direction) on a horizontal plane.

Each of the L-shaped frames 21 is composed of a flat placing table 23 having a structure as a truck which travels in the Y-direction along the guide rail 20 and on which the packing case 22 can be placed and a frame column 24 standing at an end of the placing table 23. The respective frame column 24 support horizontal arms in parallel with each other 25 so that they can be move in an upward/downward direction (Z-direction) in a cantilever state, that is, they can be lifted and lowered. The horizontal arms 25 are moved upward and downward in synchronism with each other by a not shown linear guide, a motor, a screw shaft and the like which are disposed between the frame columns 24. Further, The placing table 23, the frame columns 24, the horizontal arms 25 and the like are arranged so as to be divided each other, so that when they are not used or they are installed at another place, they can be divided and accommodated in a minimum necessary space.

A taking-out portion support arm 26 which is approximately as long as the tube 13 is disposed at the extreme ends of the horizontal arms 25 in such a manner that it is perpendicular to the horizontal arms 25 on the horizontal plane. The taking-out portion support arm 26 is used to support tube taking-out means and the like which will be described later and can be moved in the direction (Y-direction) which is perpendicular to the tube inserting direction (X-direction) by a moving unit composed of a not shown motor, a rack and a gear, a linear guide and the like. Further, one end of the taking-out portion support arm 26 is arranged as a fixed portion and the other end thereof is provided with a rotary shaft and a linear shaft so that the other end can be subjected to positional alignment to permit the taking-out portion support arm 26 to be set up to the horizontal arms 25. A reversing beam 27 is disposed below the taking-out portion support arm 26 in parallel therewith and can be normally and reversely turned a predetermined angle about a horizontal axis center (X-axis center) by a not shown rotary actuator.

The reversing beam 27 is provided with tube grasping means 28 for taking out a predetermined number of the tubes 13 from the packing case 22 in a lump, tube positioning means 29 for positioning the grasped tubes at the inserting positions to the holes 15 of the partitions 14 and tube taking-out means 30 for sequentially taking out the tubes 13 grasped by the tube grasping means 28 one by one. The tube grasping means 28 and the tube taking-out means 30 are combined with each and constitute a set of a tube taking-out unit 31. A plurality of the tube taking-out units 31 are intermittently disposed along the longitudinal direction (X-direction) of the taking-out portion support arm 26 and adapted to take out the U-shaped tubes 13 from the packing case 22 by grasping both sides thereof at a plurality of positions along the longitudinal direction thereof and to stock them at predetermined inserting positions as well as make preparation for inserting the tubes 13 by taking them one by one from their stocked position.

The tube positioning means 29 is composed of the taking-out portion support arm 26 which supports the tube taking-out unit 31 and the reversing beam 27 and positions the tubes 13 grasped by the tube grasping means 28 by moving them in the horizontal direction (Y-direction) perpendicular to the tube inserting direction (X direction) and the vertical direction (Z direction) and turning them about a horizontal axis center (X-axis center).

Tube feeding means 32 is disposed in the vicinity of the rearmost one of the tube taking-out units 31 in the X-axis direction, that is, a tube taking-out unit 31a. The tube feeding means 32 is disposed at an end of the taking-out portion support arm 26 and has a function for feeding the tubes 13 taken out by the tube taking-out means 30 to the partitions 14 side and inserting them into the holes 15 of the partitions 14.

Figure 2:
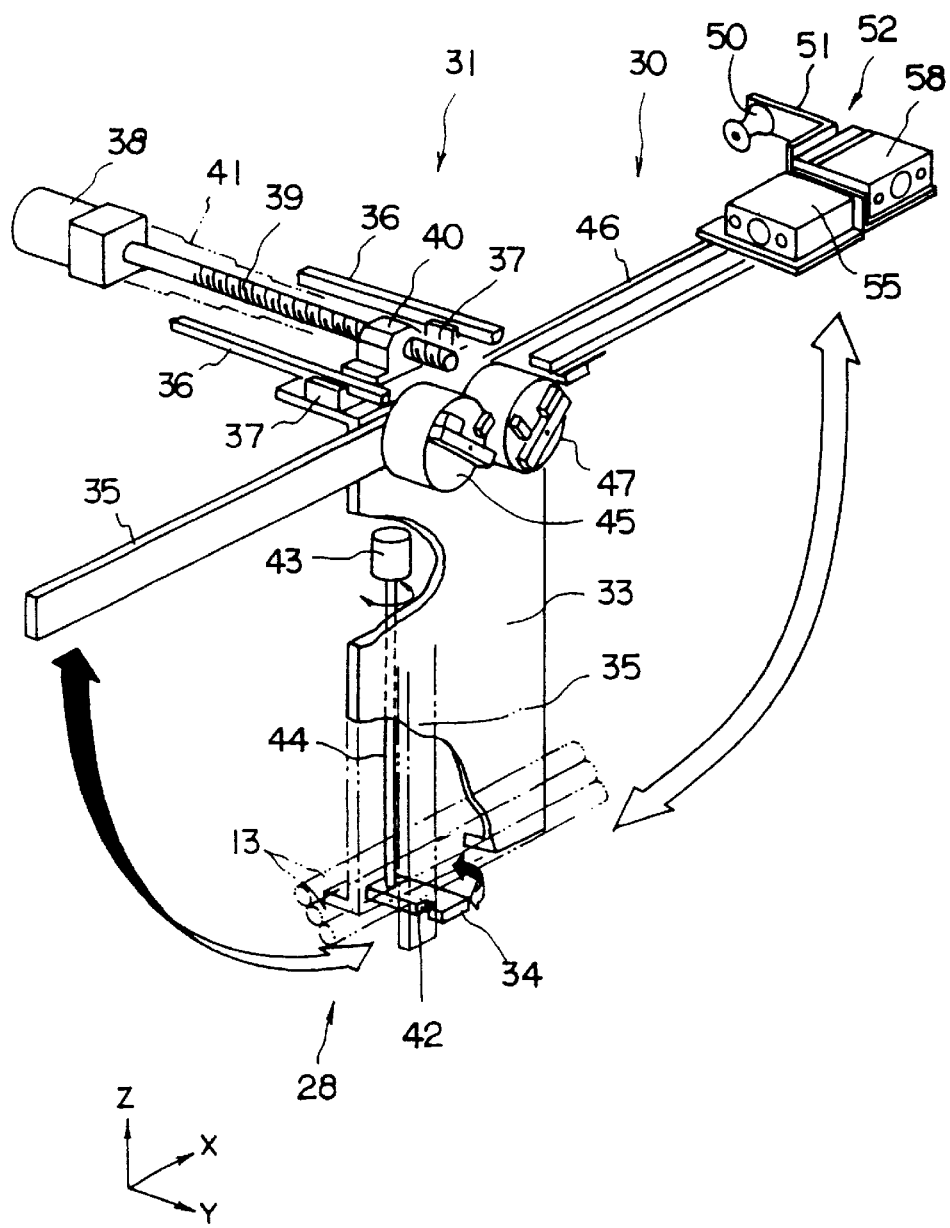
FIG. 2 is a perspective view showing tube taking-out means in the embodiment in an enlarged fashion.
Figure 3:
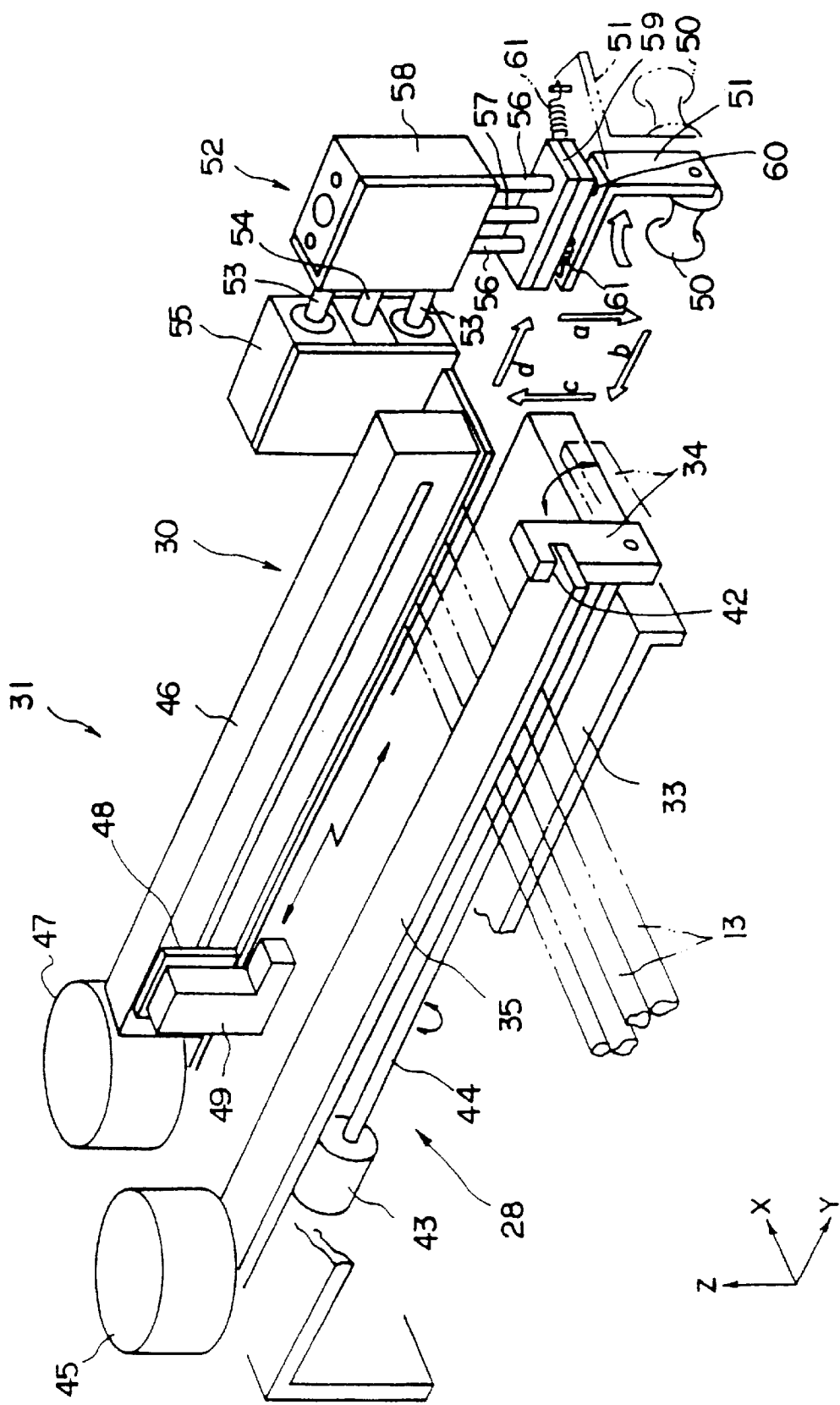
FIG. 3 is a perspective view showing operation of the tube taking-out means in the embodiment.

The arrangement and operation of the tube grasping means 28 and the tube taking-out means 30 will be described with reference to FIG. 2 and FIG. 3. FIG. 2 shows the state that the tubes 13 are taken out from the packing case 22 by being grasped and FIG. 3 shows the state that the grasped tubes 13 are taken out to the inserting positions one by one.

The tube grasping means 28 is composed of a hanger 33 for clamping a group of the tubes 13 piled up in the packing case 22 from a side surface thereof, a hook 34 for supporting the lowermost tube 13 from a lower side, a support arm 35 for clamping the group of the tubes 13 from the side opposite to the hanger 33 and a drive mechanism for driving the above components. Note, each of these components is provided in a pair at adjacent positions with their backs confronting each other to simultaneously grasp both the sides of the tubes 13 in the state that the U-shaped curved portions thereof are in a horizontal state. However, FIG. 2 and FIG. 3 show only one of the tube grasping means 28 for grasping one of the sides of the U-shaped tubes 13 and omit the other tube grasping means 28 for grasping the other side.

The hanger 33 is composed of a slightly wide rectangular thin sheet and disposed with its surface set in parallel with the longitudinal direction of the tubes 13 as well as an end thereof bent to have an L-shape is supported by a pair of rail-like linear guides 36 provided with the reversing beam 27 through sliding engagement portions 37. A screw shaft 39, which is normally and reversely rotated by a drive motor 38 provided with the reversing beam 27, is disposed at the center between the linear guides 36 in parallel therewith and screwed with a nut portion 40 disposed to the hanger 33, so that the hanger 33 can be reciprocally moved in the Y-direction by the rotation of the drive motor 38. Further, since the linear guides 36 are secured to the reversing beam 27, the hanger 33 is turned integrally with the reversing beam 27 about the X-axis center, so that the hanger 33 approximately in a horizontal state in FIG. 1 can be approximately vertically lowered by the turn of the reversing beam 27 as shown in FIG. 2. The screw shaft 39 is covered with a screw shaft cover 41 to prevent drops of oil being applied thereto.

The hook 34 is composed of a small thin sheet piece disposed to the lower end of the hanger 33 set to the vertical state so as to be perpendicular to the hanger 33. The hook 34 is approximately as thick as the hanger 33 and has a hook-shaped recess 42 defined at an edge thereof. The hook 34 is secured to the lower end of a vertical rotary shaft 44 which is coupled with a rotary actuator 43 secured to the reversal beam 27. The hook 34 is selectively changed to a position where it is abutted against the lower end surface of the hanger 33 and a position where it is displaced from the lower end surface.

The support arm 35 is composed of a slender bar which is narrower than the hanger 33 and approximately as thick as and as long as the hanger 33. The support arm 35 is disposed in parallel with the hanger 33 with a fixed gap formed between a side surface of the hanger 33 and the same. An end of the support arm 35 is coupled with a rotary actuator 45 disposed to the upper end of the hanger 33 and the other end thereof is turned about a Y-axis. The support arm 35 can move from a horizontal position shown by a solid line in FIG. 2 to a vertical position shown by a virtual line. When the support arm 35 is turned to the vertical position, the lower end thereof is engaged with the recess 42 of the hook 34 so that the support arm 35 is stopped and secured at the position.

When the tubes 13 are grasped in the above arrangement, the hanger 33 is turned to the vertical state shown in FIG. 2 about the X-axis center together with the reversing beam 27 from the horizontal state shown in FIG. 1 as well as moved to the position of the predetermined tubes 13 accommodated in the packing case 22 by moving the L-shaped frames 21 in the Y-direction and the horizontal arms 25 are lowered in the state shown in FIG. 2 that the support arm 35 is held at an open position. With this operation, the hanger 33 is disposed to a side of the tubes 13 through the internal gap in the packing case 22 and the hook 34 is disposed below the lowermost tube 13.

Then, the screw shaft 39, is rotated by driving the drive motor 38 to thereby move the hanger 33 along the linear guides 36 so as to cause the hanger 33 to approach the tubes 13. Specifically, first, the hanger 33 is abutted against a side surface of one of the sides of the U-shaped tubes 13 as well as the hook 34 is inserted below the lowermost tube 13. Next, the support arm 35 is turned from the horizontal state shown by the solid line to the vertical state shown by the virtual line in FIG. 2 to thereby abut the support arm 35 against the other side surface of the above side of the tubes 13 so as to grasp the tubes 13. Further, the other grasping means, which is not shown, adjacent to the above-noted grasping means is also operated at the same time to grasp the other side of the tubes 13.

Thereafter, when the hanger 33 is turned upward about 90° on the drawing paper from the state shown in FIG. 2 by the turn of the reversing beam 27, the hanger 33 is set approximately horizontal as shown in FIG. 3. As a result, a plurality of the tubes 13 are supported laterally on the hanger 33 with the U-shaped curved portions at the bent ends of the tubes kept in a vertical state, which is the state shown in FIG. 1, in which the respective sides of the tubes 13 are disposed on an upper side and a lower side. Thereafter, the taking-out portion support arm 26 and the reversing beam 27 which serve as the tube positioning means 29 are driven to thereby move the tubes 13 in the Y-direction and Z-direction and turn them about the X-axis so that the tubes 13 are set to the tube inserting positions. Thereafter, the plurality of grasped tubes 13 are sequentially taken out one by one by the tube taking-out means 30 from the tube located at the extreme end of the hanger 33 to thereby make preparation for inserting the tubes 13 to the side of the partitions 14.

As shown in FIG. 2 and FIG. 3, the tube taking-out means 30 includes a push-out rodless cylinder 46 disposed on the surface of the hanger 33 in confrontation with the support arm 35. An end of the rodless cylinder 46 is coupled with a rotary actuator 47 disposed to the upper end of the hanger 33 and the other end thereof is turned about the Y-axis. As a result, the rodless cylinder 46 can move to the position (position in FIG. 3) where it becomes parallel with the support arm 35 by turning 90° from the position (position in FIG. 2) where it is disposed linearly with the support arm 35. A pushing piece 49, which is formed to have an approximately an L-shape when viewed from a side surface, is provided with a rodless cylinder head 48 as a moving piece disposed on the side of the side surface of the rod less cylinder 46. The pushing piece 49 is moved to the hook 34 side after the rodless cylinder 46 is disposed in parallel with the support arm 35 in the state that the tubes 13 are horizontally grasped as shown in FIG. 3, by which the plurality of tubes 13 grasped by the hanger 33 and the support arm 35 are pushed out to the hook 34 side. However, the push-out action is executed in a state that the extreme end side of the hanger 33 is closed by the hook 34 as shown by a solid line in FIG. 3 and stopped in a state that the respective tubes 13 are aligned on the hook 34 side. After the alignment, the hook 34 is turned as shown by a virtual line in FIG. 3 to thereby open the extreme end side of the hanger 33 and a grooved roller 50 to be described below pulls out one of the tubes 13 located on the extreme end side in this state.

That is, the tube taking-out means 30 includes the U-shaped grooved roller 50 for supporting the tube 13 from the lower side thereof, a link 51 for supporting the grooved roller 50 and a cylinder unit 52 for moving the link 51 vertically and laterally to thereby take out the tube 13 on a side at the extreme end of the rodless cylinder 46. The cylinder unit 52 is arranged by combining a cylinder 55 with a lateral motion guide having lateral motion guides 53 and a lateral motion rod 54 and a cylinder 58 with a longitudinal movement guide having longitudinal motion guides 56 and a longitudinal motion rod 57 which are located on the extreme end side of the rodless cylinder 46. Flat roller support sheets 59 are coupled with the extreme end of the longitudinal motion rod 57 of the cylinder 58 with the longitudinal movement guide, the L-shaped link 51 is rotatably provided with the roller support sheets 59 through a shaft 60 and a spring 61 and the grooved roller 50 is rotatably supported by the link 51.

The cylinder unit 52 is driven in association with the opening motion of the hook 34, the grooved roller 50 is lowered to a predetermined position (arrow a) by the drive of the cylinder unit 52, then laterally moved to the lower side of the tube 13 at the extreme end (arrow b), thereafter moved upward and receives the tube 13 (arrow c) and takes out it externally (arrow d) as shown by the arrows a, b, c and d in FIG. 3.

This motion will be described in greater detail hereinbelow. After the tubes 13 are aligned by the pushing piece 49 of the rodless cylinder 46 in accordance with the position of the hook 34 in the state that the hook 34 is closed, the pushing piece 49 is returned. Subsequently, the grooved roller 50 is moved downward (arrow a) and thereafter pulled near to the hanger 33 side (arrow b) and then the grooved roller 50 is moved upward in accordance with the position of the outermost tube 13 (arrow c). The hook 34 is opened at the time the grooved roller 50 holds the tube 13 therein and after the tube 13 is taken out from the hanger 33 (arrow d), the hook 34 is closed again. With this job, only one tube 13 is taken out from the hanger 33, by which preparation for feeding the tube 13 to the tube feed means 32 is finished.

The grooved roller 50 and the link 51 are turnably supported by the shaft 60 at the tube taking-out position as well as usually disposed at the tube taking-out position by the spring 61. However, when the U-shaped curved portion on the bent end side is caused to pass by a subsequent tube inserting motion, the grooved roller 50 and the link 51 can make an escape motion in the tube inserting direction through the shaft 60. With this motion, the tube 13 can be smoothly fed to the partitions 14 side.

Figure 4:
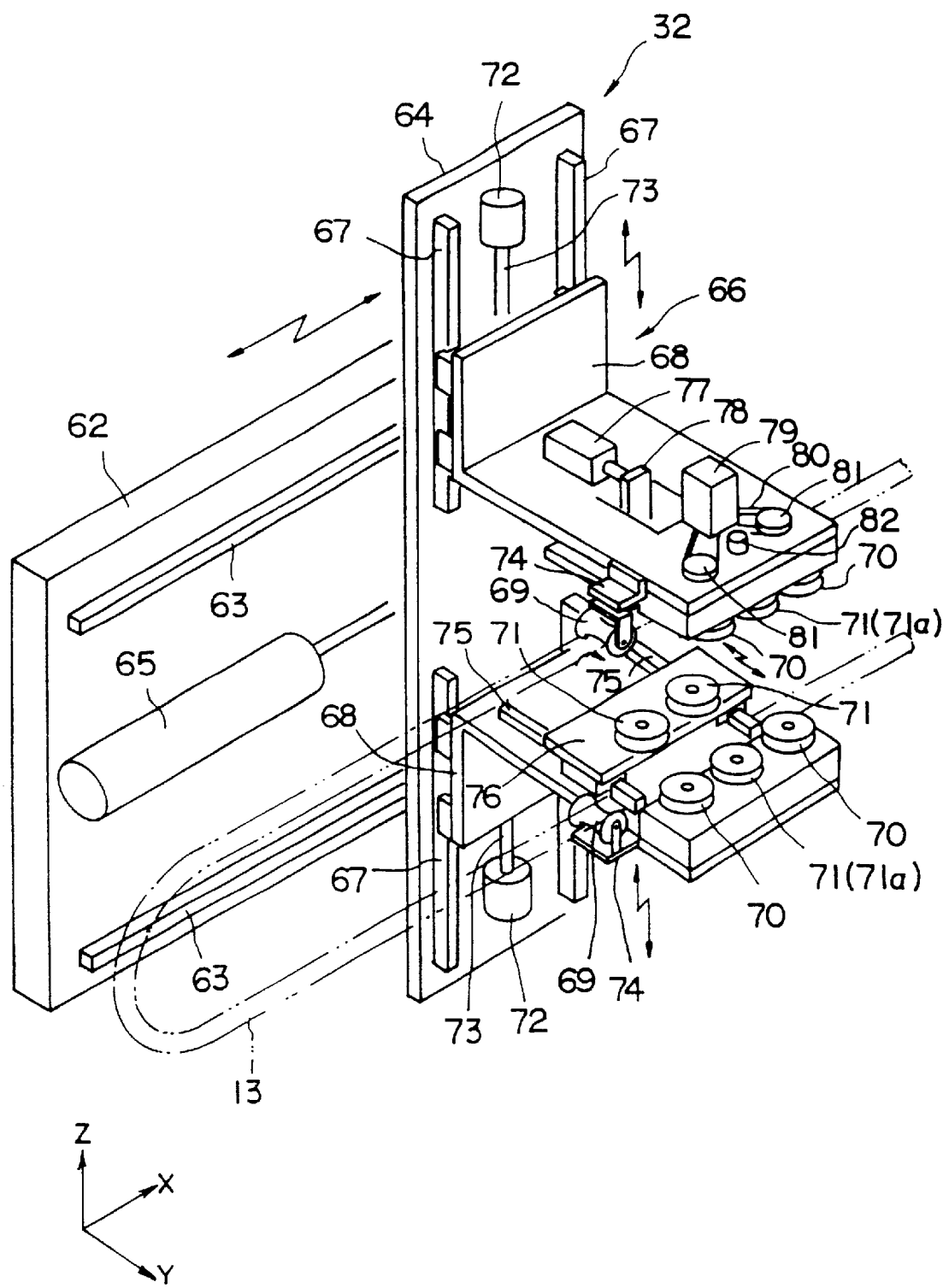
FIG. 4 is a perspective view showing tube feed means in the embodiment in an enlarged fashion.
Figure 5:
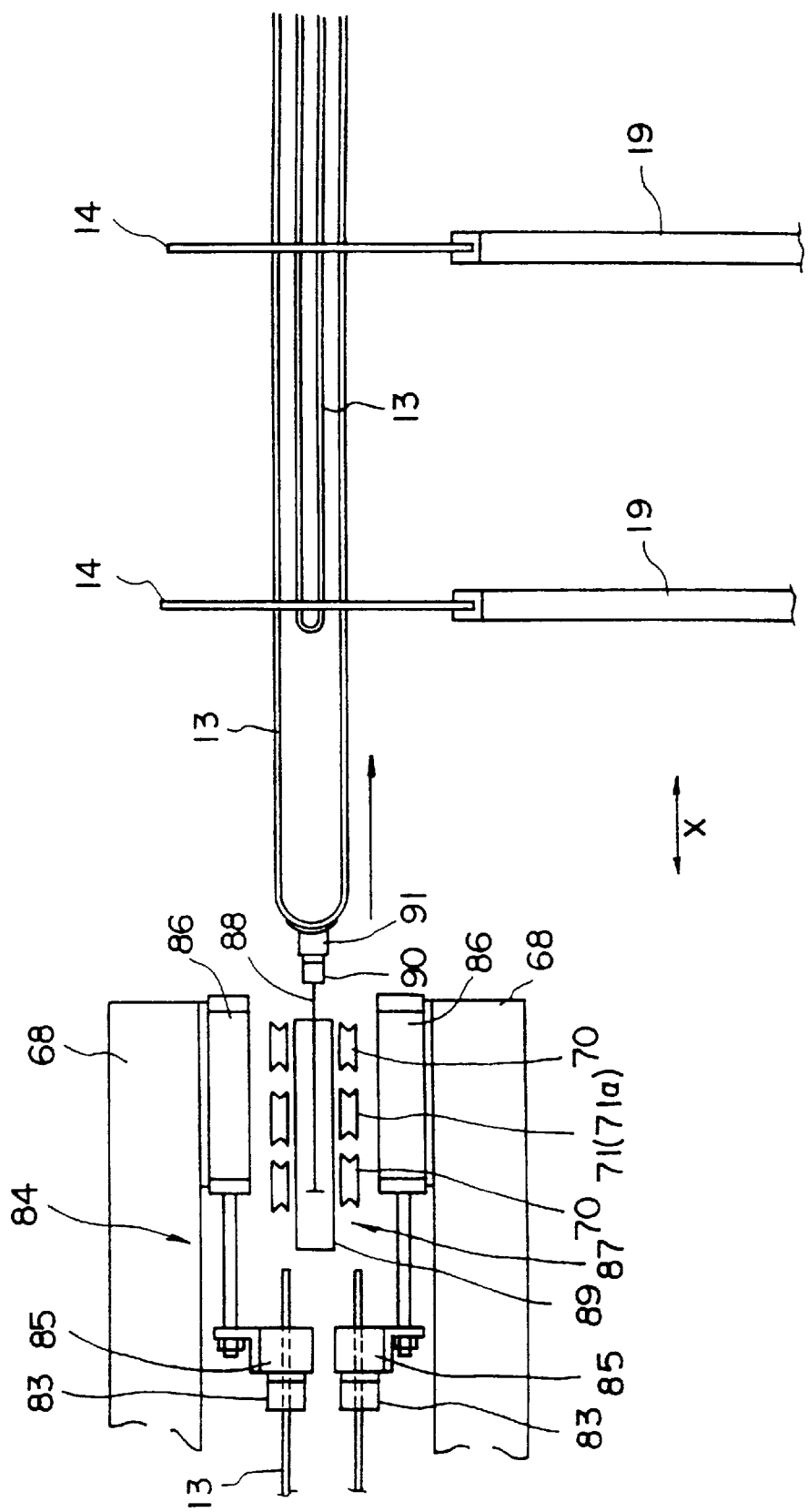
FIG. 5 is a side elevational view showing the tube feeding means in an enlarged fashion.

Next, the arrangement and operation of the tube feed means 32 will be described hereunder with reference to FIG. 4 and FIG. 5. FIG. 4 is a perspective view showing the overall arrangement of the tube feed means 32 and FIG. 5 is a side elevational view showing the partial arrangement of the tube feed-out means 32 in which some components are arranged differently from those in FIG. 4.

As shown in FIG. 4, the tube feed means 32 is disposed on the partitions 14 side of the tube taking-out unit, that is, on a workpiece side and includes a support sheet 62 secured to the taking-out portion support arm 26, a base 64 which is long in a longitudinal direction and disposed to the support sheet 62 so as to move in the X-direction through a rail-shaped feed unit moving linear guide 63 and a feed unit moving air cylinder 65 for moving the base 64 in the X-direction. Further, a pair of upper and lower feed units 66 are provided with the base 64. Each of the feed units 66 includes a roller support frame 68 which is upward and downward movably supported by the base 64 through upward/downward moving linear guides 67. Each of the roller support frames 68 includes a guide roller 69 for receiving the extreme end of the tube 13 and feeding drive rollers 70 and follower rollers 71 which are disposed downstream of the tube inserting direction (X-direction) of the guide roller 69 in the roller support frame 68 and turned in a state that they clamp the tube 13 to thereby feed the tube 13 on the side of the partitions 14.

The above arrangement will be described below in more detail. The upper and lower roller support frames 68 are formed to have an L-shape when viewed from a side surface, confront each other in an upward/downward direction and are equally moved in the upward/downward direction by motors 72 and drive screw shafts 73 disposed on the base 64. With this operation, the positions of the respective rollers 69, 70 and 71 can be caused to conform with the width between both the sides of the tube 13. The guide rollers 69, the drive rollers 70 and the follower rollers 71 are disposed on the upper surface and the lower surface, which confront each other, of the roller support frames 68, respectively. The guide rollers 69 are formed to a U-shape and have a grove formed thereto and confront each other in the upward/downward direction. Each of the guide rollers 69 is disposed to the front edge of the roller support frame 68 through a roller supporter 74. The drive rollers 70 and the follower rollers 71 have a V-shaped groove formed thereto. The plurality of drive rollers 70 and the follower rollers 71 are disposed on the confronting surfaces of the roller support frames 68 on the right side and the left side in confrontation with one another in lines.

For example, a pair of the forward and rearward follower rollers 71 are disposed on the left side with respect to the tube feeding direction (X-direction in FIG. 4) and supported by a clamp 76 which is movable along a clamp guides 75 provided with the roller support frame 68. The clamp 76 is coupled with a clamping air cylinder 77 mounted on the non-confronting surface of the roller support frame 68 through a coupling unit 78 to permit the position where the tube is clamped to be adjusted by the follower rollers 71 in a width direction. Further, a pair of the forward and backward drive rollers 70 and a measuring follower roller 71a interposed therebetween are secured on the right side. The respective drive rollers 70 are driven in rotation by a drive motor 79, a drive belt 80 and a drive gear 81 mounted on the non-confronting surface of the roller support frame 68. Each of the measuring follower roller 71a is connected to an encoder 82 mounted on the non-confronting surface of the roller support frame 68. The feed rate of the tube 13 is detected by the encoders 82 based on the number of revolution thereof. Since the V-shaped groove is formed to the drive rollers 70 and the follower rollers 71 for clamping the tube 13, even if the diameter of the tube 13 varies, they can process the tube 13. Since urethane rubber is lined on the V-groove in addition to the above, even if a clamping force is excessively strong, the tube 13 is not injured.

According to the tube feed means 32 arranged as described above, after the gaps between the respective rollers are adjusted in correspondence to the width and diameter of the tube, the base 64 is moved forward and backward along the X-direction and to thereby receive the respective extreme ends on the open end side of the tube 13 having taken out by the tube taking-out means 30 mentioned above in the state that it is clamped by the guide roller 69 as well as feed out the tube 13 on the partitions 14 side by the rotation of the drive rollers 70 and the follower rollers 71.

Tube feeding means 32 arranged as shown in FIG. 5 is provided with introduction mechanisms 84 with air chucks 83 in place of the guide rollers 69. The introduction mechanisms 84 with the air chucks 83 are arranged such that a pair of the right and left air chucks 83 which are opened and closed by opening/closing air cylinders 85 can be moved in the X-direction by moving air cylinders 86. As a result, the introduction mechanisms 84 reciprocally move independently of each other to thereby introduce the tube 13 from the tube taking-out means 30 to the positions of the drive rollers 70 and the follower rollers 71. Therefore, the drive rollers 70 and the follower rollers 71 may be fixedly disposed in the X-direction.

The tube feeding means 32 shown in FIG. 5 is provided with a cylinder unit 87 for pushing the bent end side of the tube 13, that is, the U-shaped curved portion thereof to the partitions 14 side. The cylinder unit 87 includes a pushing air cylinder 89 having a motion rod 88 directed to the partitions 14 side and a push metal fitting 91 mounted to the extreme end of the motion rod 88 through a force gauge 90 and pushes the tube 13 to the partitions 14 until the final position thereof is reached. In this arrangement, there is added a function for stopping the motion of the air cylinder 89 in response to a signal from the force gauge 90 when a force larger than a prescribed value is applied to the tube 13 at the final position, by which the tube feeding means 32 can be perfectly automatically operated.

The tube assembling apparatus of the embodiment arranged as described above can take out and stock the plurality of tubes 13 from the packing case 22 by the tube grasping means 28, the tube positioning means 29, the tube taking-out means 30 and the tube feeding means 32, draw out only one of the tubes 13 without interfering with the other tubes 13, feed the tube 13 to the partitions 14 side and assemble it in the feed water heater 11.

Since the upper and lower open end sides of the tube 13 are moved by the independent drive motors 72 in the tube feeding means 32 arranged as shown in FIG. 4, an error may be caused in the amount of feeding of the tube 13 because the tube 13 is caught on the partitions 14 sides or the drive motors 72 are irregularly rotated. However, there is employed operation control means for automatically absorbing a feed rate error by adding functions for detecting an operating speed to respective operating units to prevent the deformation and damage of the tube 13. For example, a function for detecting a feed operation speed can be achieved by reading the numbers of pulses of the encoders 82 directly coupled with the upper and lower measuring follower rollers 71a by a control console and outputting an abnormal signal when any of the numbers of the upper and lower pulses exceeds a prescribed number of pulses. Further, even if the feed of the tube 13 is stopped by the collision of the tube 13 against the partition 14, the feed of the tube 13 can be stopped by the encoders 82 for detecting the operation speed.

There is provided a function for automatically determining the position where the tube 13 is inserted, the function being arranged such that when the initial tube is inserted, the alignment of the tube is carried out by manual operation and then the position where the next tube 13 is inserted is automatically indexed from the initial position of the tube 13 on a coordinate. Accordingly, the requirement of a subsequent alignment job can be omitted. A similar function can be applied to the tube taking-out means 30, in which case the hanger 33 can be automatically moved to the position of the tube which is taken out from the packing case 22 without the need of adjustment relating to the width of the tube 13, a processing position and the like.

Further, in above the tube taking-out means 30, since the grooved roller 50 which supports the upper side of the tube 13 can be turned in a traveling direction by the link 51 and the spring 61, when the grooved roller 50 comes into contact with the U-shaped curved portion of the tube 13, it is forcibly turned and bypasses the U-shaped curved portion to thereby permit the tube 13 to be smoothly fed after it is taken out. A similar mechanism can be employed to the roller support table 74 of the guide roller 69 provided with the tube feed means 32 shown in FIG. 4.

As shown in FIG. 1, a control system for controlling the operation of the above respective components is composed of a control panel 92 mounted on each of the L-shaped frames 21, an operation panel 93 through which data can be input, overall operation can be carried out and operation can be monitored, a first operation box 94 through which the tube can be grasped and taken out and a second operation box 95 through which the tube feed means 32 can be operated. Additional switches are abolished in the first and second operation boxes 94 and 95 by automatically and manually switching necessary items and they are also abolished in the operation panel 93 by employing touch panels which save a space and is used to data input, overall operation and monitor and to switch a screen in accordance with each mode. Further, an emergency stop switch is provided with each of the control panel 92 and the operation boxes 94 and 95 independently of an operation system to prevent malfunction if it should happen. Multiconductor metal receptacles are used so that the respective cables used to the control system start from the control console 92 and can be separated from each other in the unit of respective decomposable units.

Further, servo motors are mounted to the portions whose positions must be stored and the operational positions of the apparatus are stored when necessary. For example, after the hanger 33 goes for the next packing case 22 because the tubes 13 in the hanger 33 have been fed, the hanger 33 is arranged to return to the same position again. In the tube inserting job, the position where the tube 13 is inserted can be indexed on the coordinate from the size of the tube 13 in the hanger 33 using previously input data and the tube feeding means 32 can be automatically aligned to the tube inserting position.

Rotary actuators 35 and 43 and the like which are the operating means of the support arm 35, the hook 34 and the like of the tube taking-out means 30 are driven by air, so that when they collide against an obstacle or are overloaded, they stop further motion to prevent the damage of the tube 13 and the like as well as they issue an error signal and a warning. In addition, the hanger 33 detects that it is excessively opened when it takes out the tube 13 and that it is excessively lowered in the packing case 22 or it is displaced therein and also issues an error signal and a warning. These detecting operations can prevent malfunctions and unexpected accidents as well as provide friendly circumstances to workers and workpieces, which are intrinsically free from danger.

Figure 6:
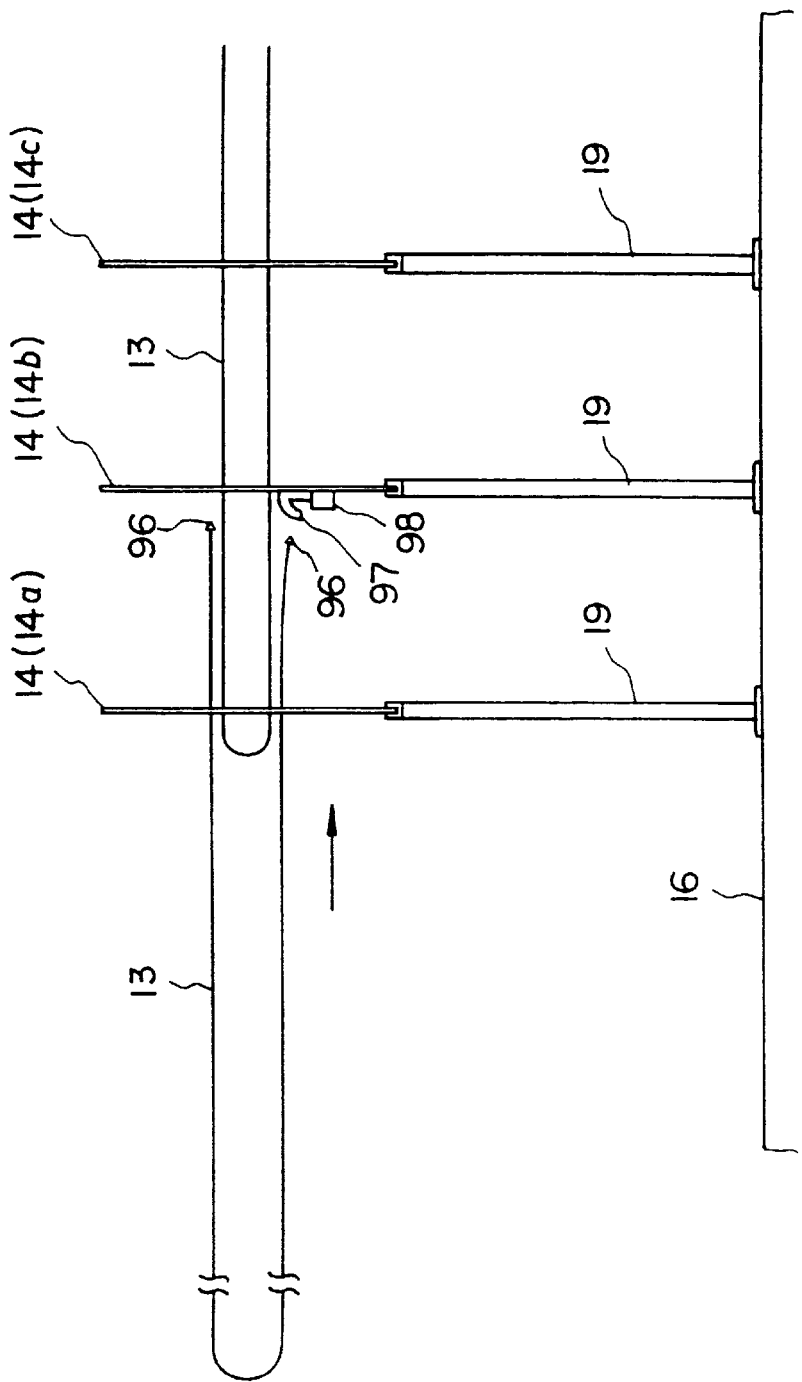
FIG. 6 is a side elevational view showing how tubes are inserted in the embodiment.

Next, an accessory and the like of the tube 13 and the partition 14 for securely and safely inserting the tube will be described with reference to FIG. 6 and FIG. 7. FIG. 6 is a view showing the overall arrangement of the accessory and the like and FIG. 7 is a partially enlarged view thereof.

As described above, a plurality of the partitions 14 into which the tubes 13 are inserted are supported on the working truck 16 in the state that the height of the partitions 14 are adjusted to keep the centers of the holes 15 of the partitions 14 horizontal with suitable gaps defined therebetween in accordance with the length of the tubes 13. When the tube 13 is inserted into the holes 15 of the partitions 14, it can be smoothly inserted into the holes 15 of the first partition 14 (14a) which is nearest to the tube feed means 32 because the tube 13 is aligned with the direction whose height is adjusted on the tube assembling apparatus side. However, when the tube 13 passes through the second partition 14 (14b), the extreme end of the tube 13 is lowered by the gap between the hole 15 of the partition 14b and the outside diameter of the tube 13 which is formed to permit the tube 13 to pass therethrough and further the extreme end of the tube 13 is flexed by the interval between the partitions. As a result, there is a possibility that the tube 13 collides against the partition 14b and the partition 14b or the tube 13 is injured.

Figure 7:
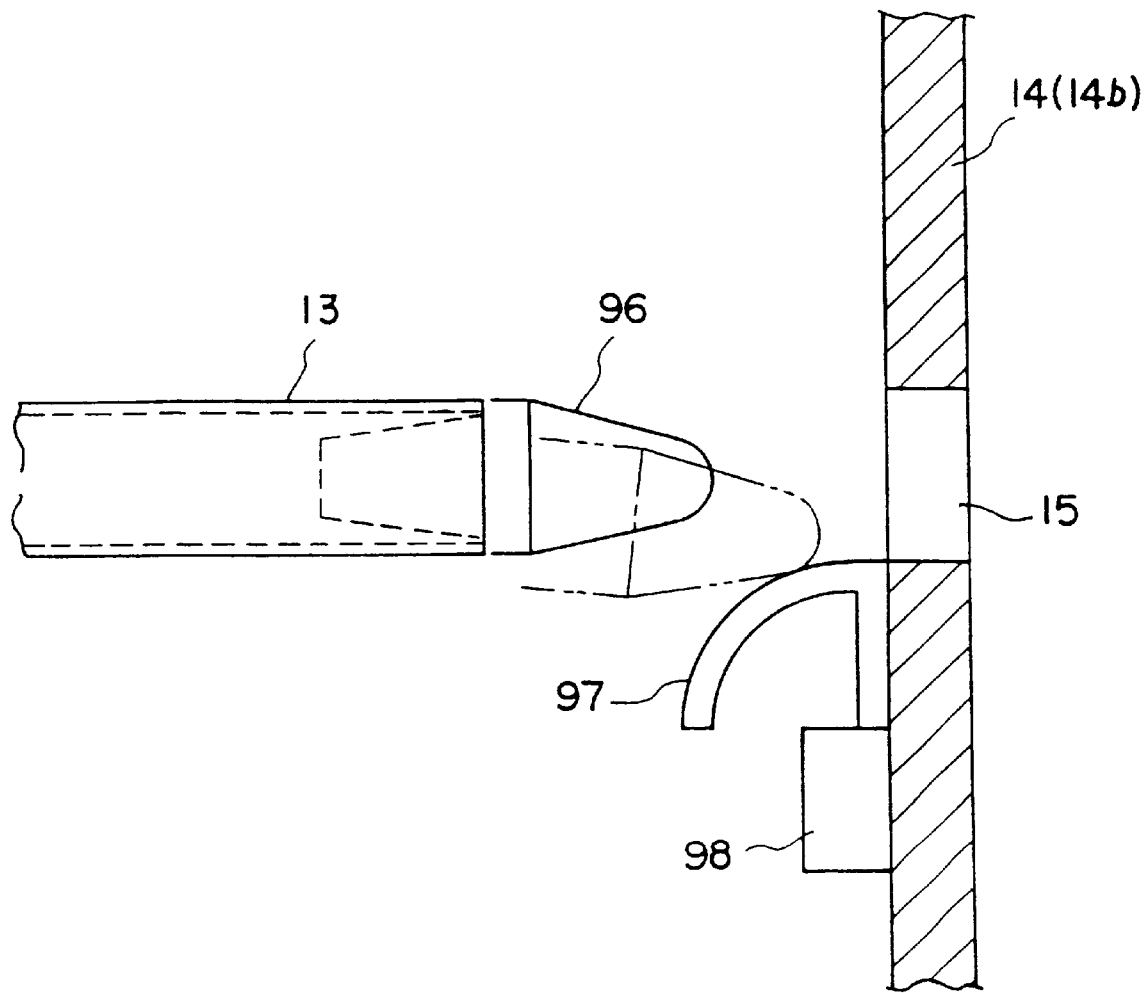
FIG. 7 is an enlarged view of the main portion of FIG. 6.

To cope with this problem, a cone-shaped cap 96 having a taper-shaped sharp extreme end is mounted to the extreme end of the tube 13 as well as a guide member 97 having a curved surface is disposed to the lower front surface of the hole 15 of the second partition 14b to guide the cap 96 to the hole 15 in the embodiment as shown in FIG. 6 and FIG. 7. The cap 96 is composed of, for example, a material such as a resin or the like which has a low surface hardness and a small friction factor. Further, the guide member 97 is composed of a metal having a side formed to an L-shaped arc and mounted on, for example, a magnet table 98 so that it can be mounted on and dismounted from the partition 14b.

The use of the accessory arranged as described above permits the tube 13 to be smoothly inserted into the partition 14b because the flexure at the extreme end of the tube 13 is corrected along the guide member 97 even if the flexure is caused. As to the insertion of the tube 13 into the third and subsequent partitions 14 (14c), since the tube 13 has been stabilized by the partitions 14a, 14b, the guide member 97 need not be particularly mounted in many cases. However, when higher safety is desired, the guide member 97 may be provided.

Figure 8:
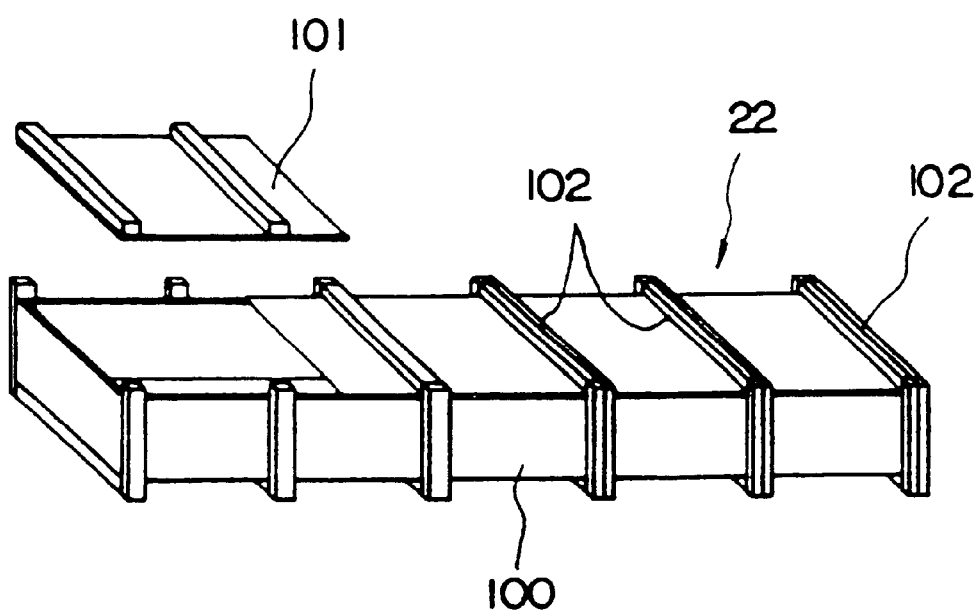
FIG. 8 is a perspective view showing a packing case in the embodiment.

Next, the packing case 22 and the tubes 13 which are accommodated in the packing case 22 will be described with reference to FIG. 8 to FIG. 11. FIG. 8 is a perspective view showing the appearance of the packing case 22, FIG. 9 is a plan view showing a state that the lid of the packing case 22 is opened, FIG. 10 is a side sectional view of FIG. 9 and FIG. 11 is a perspective view showing an applied example.

As shown in FIG. 8, the packing case 22 is made of a wood with its upper surface opened and composed of a long box-shaped main body 100 and a lid 101 divided into a plurality of sections. Packing is made by tightening the lid 101 to the case main body 100 by band-shaped metal fittings 102 such as metal bands or the like without using nails. This arrangement will be made by taking into consideration that the lid 101 can be easily opened.

Figure 9:
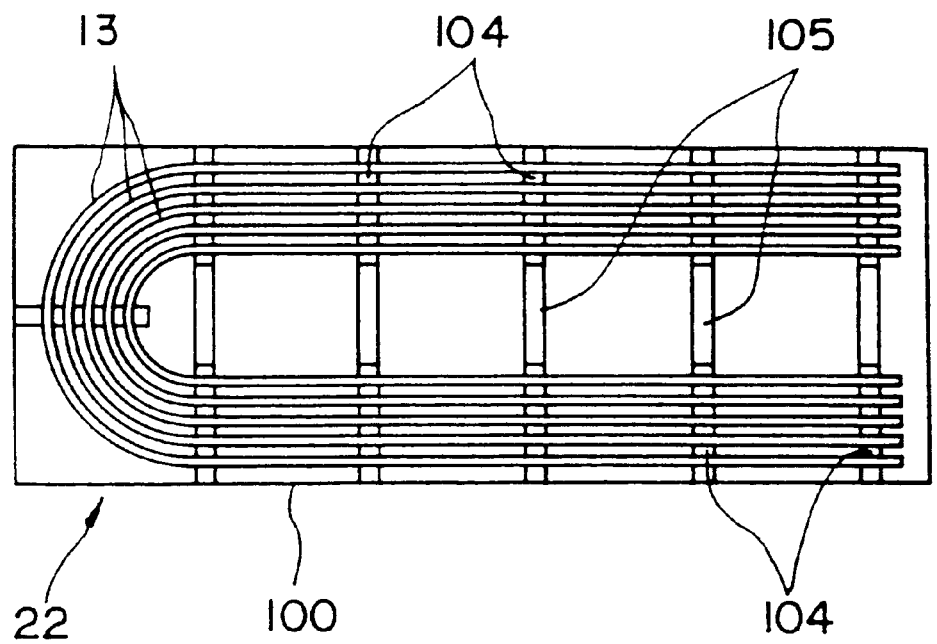
FIG. 9 is a plan view showing an interior of the packing case in the embodiment.
Figure 10:
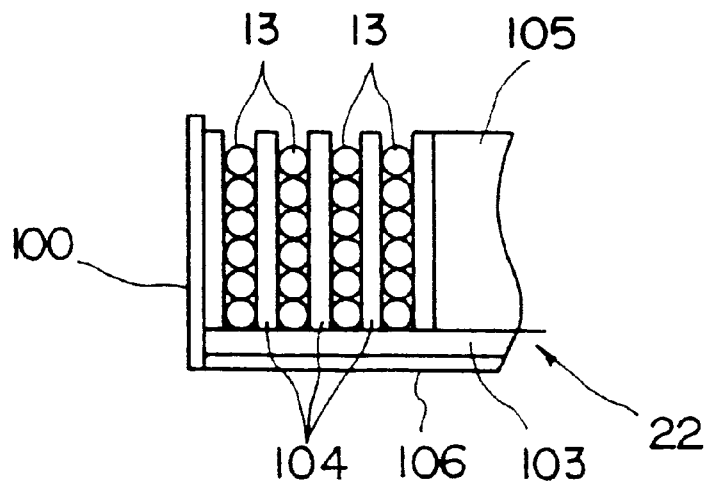
FIG. 10 is side sectional view of FIG. 9.
Figure 11:
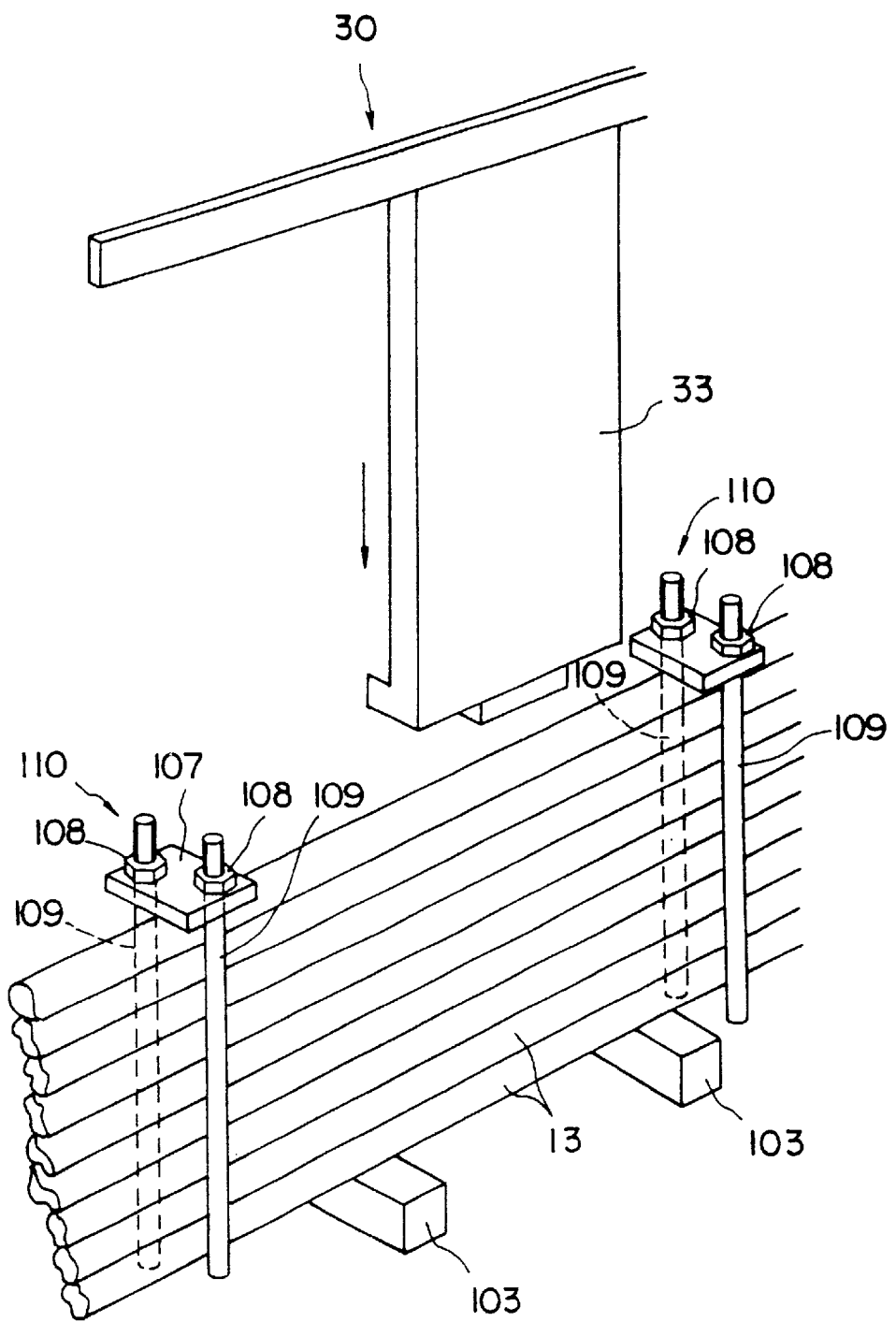
FIG. 11 is a perspective view showing a tube support structure in the packing case in the embodiment.

As shown in FIG. 9 and FIG. 10, the packing case 22 accommodates the tubes 13 in such a manner that they are laid long in a lateral direction with the U-shaped curved portions thereof disposed horizontally. A plurality of types of the tubes 13 whose U-shaped curved portions have a different radius are placed from the inside to the outside of the packing case 22 and the respective tubes 13 having the same radius are piled up. Skids 103 on which the lowermost tubes 13 are placed are disposed in the packing case 22 as well as load shift preventing tube spacers 104 which are long in a longitudinal direction are intermittently disposed in the lengthwise direction of the tubes 13 to partition the respective tubes 13 whose U-shaped curved portions have a different radius. A load shift preventing jig 105 which is arranged integrally is disposed between both the sides of the tubes 13 to accommodate the tubes 13 in the state that they doe not fall down.

With this arrangement, the load shift of the tubes 13 accommodated in the packing case 22 can be prevented while they are conveyed and the gaps between the respective tubes 13 can be kept uniform as well as the hanger 33 of the tube taking-out means 30 and the like can be inserted into the packing case 22 without causing any difficulty. The height of the skids 103 is set such that a gap is sufficiently secured between it and the bottom sheet 106 of the packing case 22. Therefore, even if the tube 13 is flexed, the interference of the tube 13 with the hook 34 located at the lowermost end of the hanger 33 of the tube taking-out means 30 can be prevented.

Further, since the above resin caps 96 are mounted to the open ends of the tubes 13 accommodated in the packing case 22, the tubes 13 can be taken out by the tube taking-out means 30 at once in the state that the packing case 22 is opened and used for assembly.

After the necessary tubes 13 are taken out by the tube taking-out means 30, the remaining tubes 13 are spaced apart from the spacers 104 and are liable to cause a load shift. To prevent the load shift, there is provided simple tube support jigs 110 each including a small piece 107 which will be placed on the remaining tubes 13 and rods 109 which are coupled with both the ends of the tubes 13 by nuts 108 or the like and hung down along both the sides of the tubes 13 as shown in FIG. 11.

Figure 12:
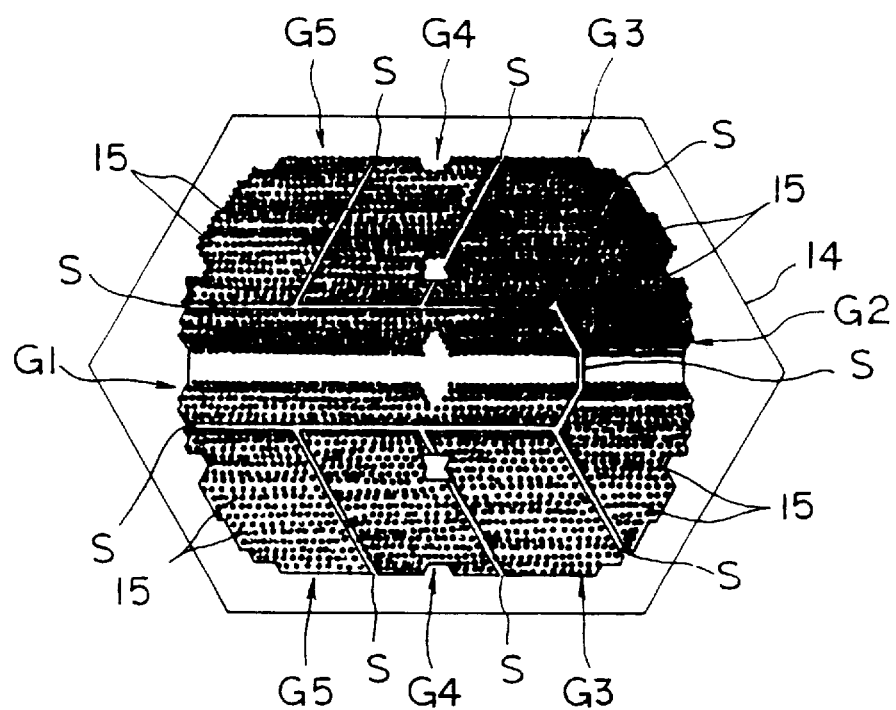
FIG. 12 is view explaining a partition used by an embodiment according to a method of the present invention.

When the tube support jigs 110 are attached to the tubes 13 in the packing case 22 as shown in FIG. 12, the tubes 13 can be kept in the piled-up state without causing the load shift until they are taken out by the tube taking-out means 30.

Figure 13:
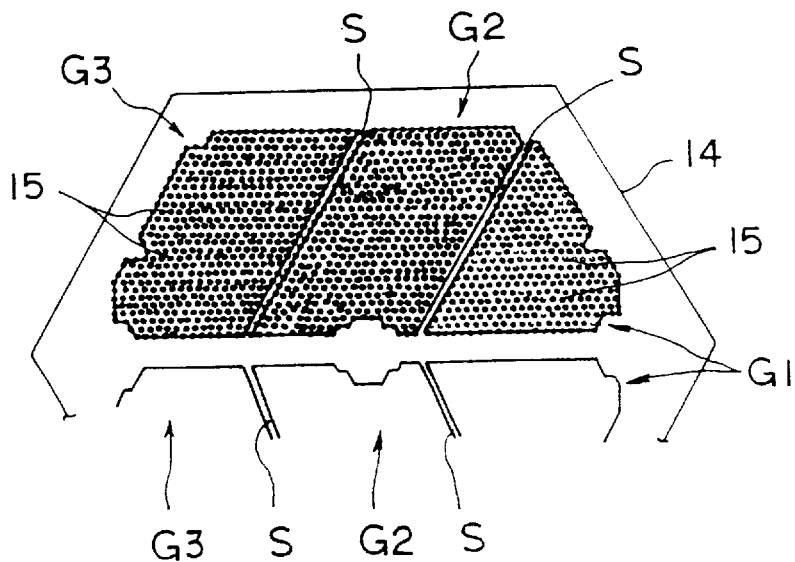
FIG. 13 is a view showing a modification of the method shown in FIG. 12.

Next, a method of assembling the tubes will be described with reference to FIG. 12 and FIG. 13. FIG. 12 is a view explaining an example of the grouping of the holes 15 of the partition 14 and FIG. 13 is a view explaining a different example.

According to the method of the embodiment, the holes 15 of the partition 14 are divided into a plurality of groups with each group covering the tubes 13 whose U-shaped curved portions have a different radius and which are inserted into the holes, and the tubes which are accommodated in the packing case 22 are divided in correspondence to the respective groups. After all the tubes 13 belonging to one group are inserted into the holes 15 corresponding thereto, the setup of the packing case 22 is changed and the tubes 13 in the next packing case 22 are assembled.

In the example of FIG. 12, the holes 15 of the partition 14 are divided into groups G1–G5. That is, since the holes 15 are divided by virtual boundary lines S (there actually exists no line S), each of the groups G1 surrounds the holes 15 located in the range within a fixed upper to lower width at the center of the partition 14 in a band shape excluding the some holes 15 left on the right side, each of the groups G2 surrounds the holes 15 on the right side of the partition 14 in a fan shape and each of the groups G3, G4 and G5 surround the holes 15 in the respective remaining portions which are approximately equally partitioned sequentially from right to left by the boundary lines S which are inclined upward in the right direction.

First, the tubes 13 whose U-shaped curved portions have the smallest radius among the U-shaped tubes are inserted into the holes (first (i.e. odd numbered) holes) on the center side of the holes 15 which belong to the first group G1. Next, the tubes 13 whose U-shaped curved portions have the second smallest radius are inserted into the holes (second (i.e. even numbered) holes) which are located above and below the first holes in the vicinity thereof. Thereafter, the tubes whose U-shaped curved portions have a gradually increasing radius are inserted in the order of odd numbered holes and even numbered holes to thereby finish the insertion of the tubes 13 into all the holes 15 which belong to the groups G1 in the same manner.

Next, processing goes on with respect to the holes belonging to the groups G2 on the right side. In the groups G2, the tubes 13 whose curved portions have a gradually increasing radius are inserted in the order of the odd numbered holes and the even numbered holes in the same manner as above. One reason why each of the groups G2 is limited to the fan-shaped range and partitioned from the other groups by the boundary line S which is inclined upward in the right direction is that if the tube 13 whose curved portion has a large diameter is inserted first, the hole 15 into which the tube 13 having a small radius is hidden by it. This is also applied to the boundaries of the following groups G3, G4 and G5 likewise.

On the completion of the assembly of the tubes 13 into all the holes 15 belonging to the groups G2, the tubes whose curved portions have a gradually increasing radius are inserted in the order of the odd numbered holes and the even numbered holes from right to left in the sequence of the groups G3, G4 and G5 in the same manner as above, whereby the assembly of all the tubes 13 is finished.

In this case, the embodiment sets the tubes 13 which are accommodated in the packing case 22 to a plurality of types having a different radius corresponding with the groups G1, G2, G3, G4 and G5. Since the tubes 13 whose U-shaped curved portions have a different radius are packed by being grouped, when the tubes are assembled, the packing cases 22 can be set up such that the packing cases 22 for the groups G1, G2, G3, G4 and G5 are placed in the vicinity of the apparatus in this order and the tubes having the respective radii are sequentially conveyed onto the placing table of the L-shaped frames 21. Therefore, since the processing of the packing cases 22 is not complicated, the assembly of the tubes can be effectively carried out as well as the space in which the packing cases 22 wait can be reduced.

Figure 18:
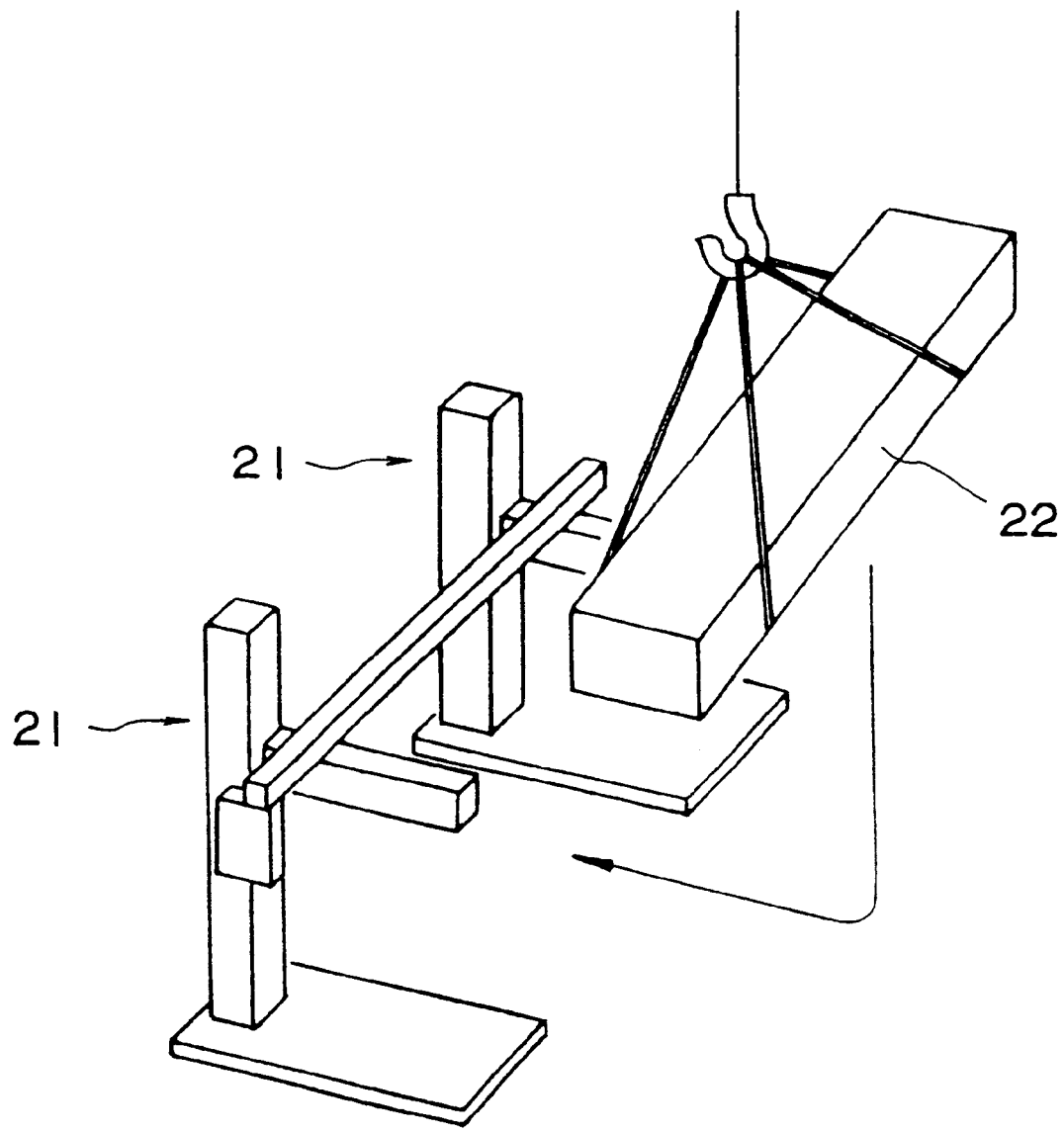
FIG. 18 is another view explaining the apparatus shown in FIG. 16.
Figure 19:
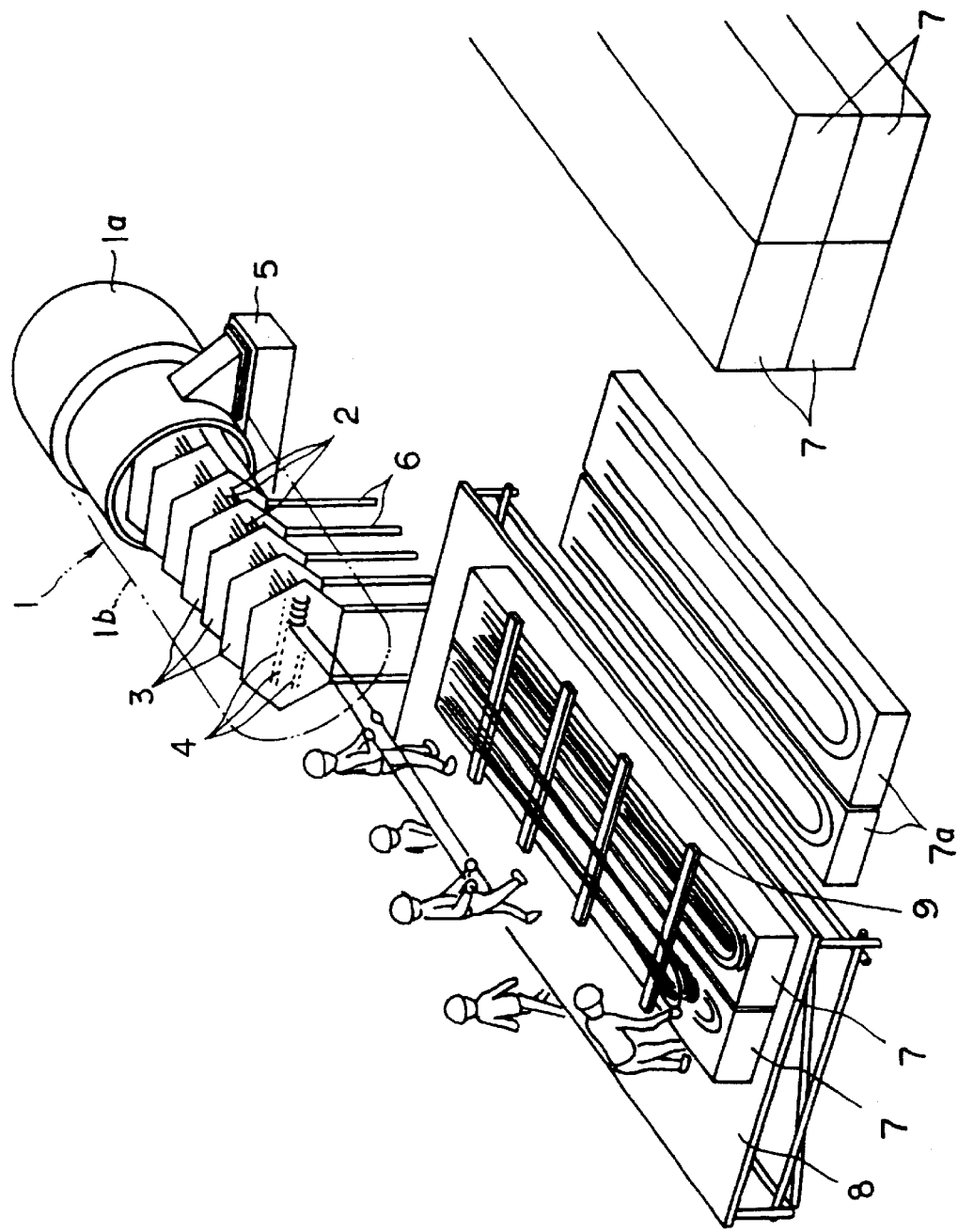
FIG. 19 is a perspective view showing prior art.
Figure 20:
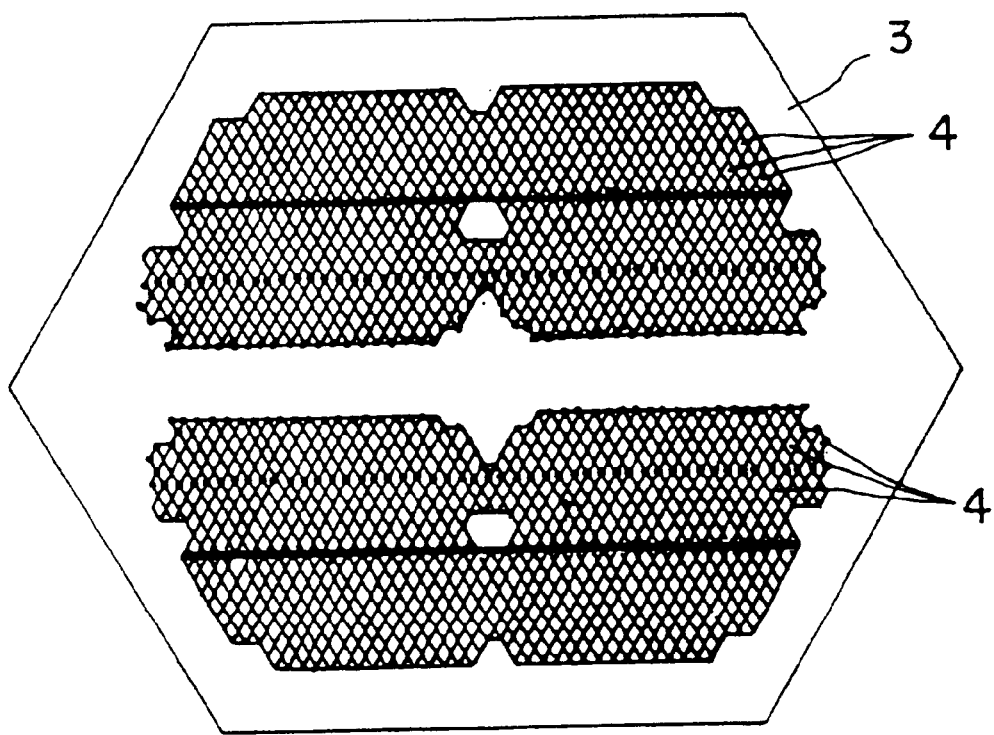
FIG. 20 is a view explaining a partition used by a method according to the prior art.
Figure 21:
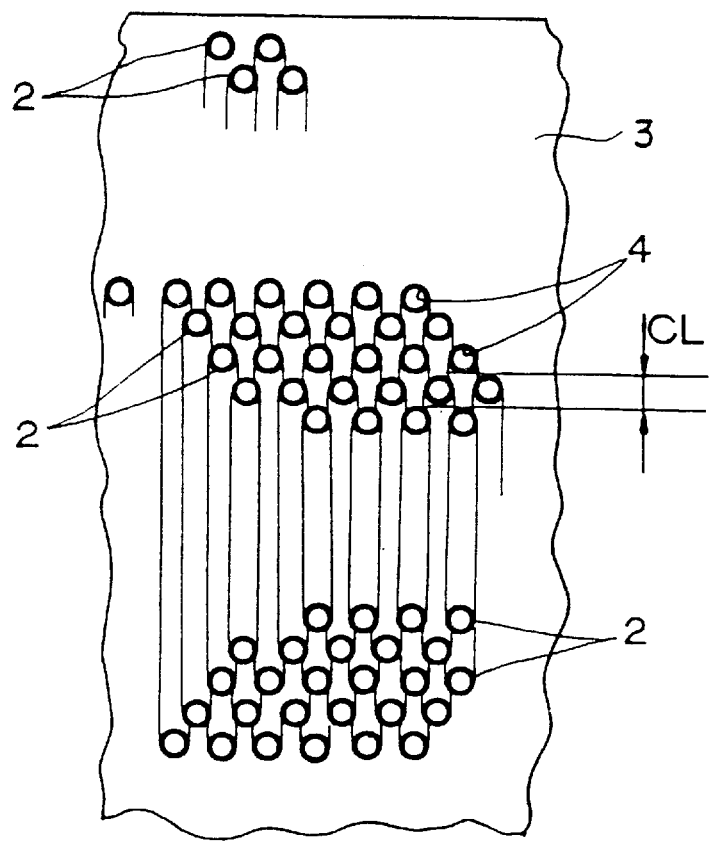
FIG. 21 is a view explaining a general example of the disposition of tubes.
Figure 22:
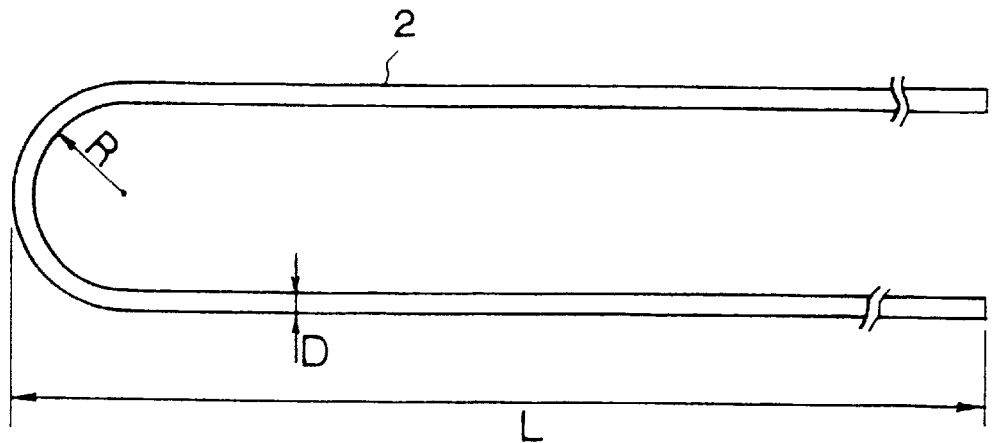
FIG. 22 is a side elevational view showing a general example of the arrangement of a tube.

The example shown in FIG. 13 roughly divides the holes 15 of the partitions 14 into three groups G1–G3. In this case, the respective groups G1, G2, G3 are, for example, approximately equally partitioned in this order from right to left by boundary lines S which are inclined upward in the right direction. Also in this example, the tubes 13 whose curved portions have a gradually increasing radius are inserted from right to left in the order of the odd numbered holes and the even numbered holes in the sequence frames 21 shown in FIG. 18 can widely use a space, the longitudinal direction and the lateral direction of the packing case 22 can be released.

Figure 14:
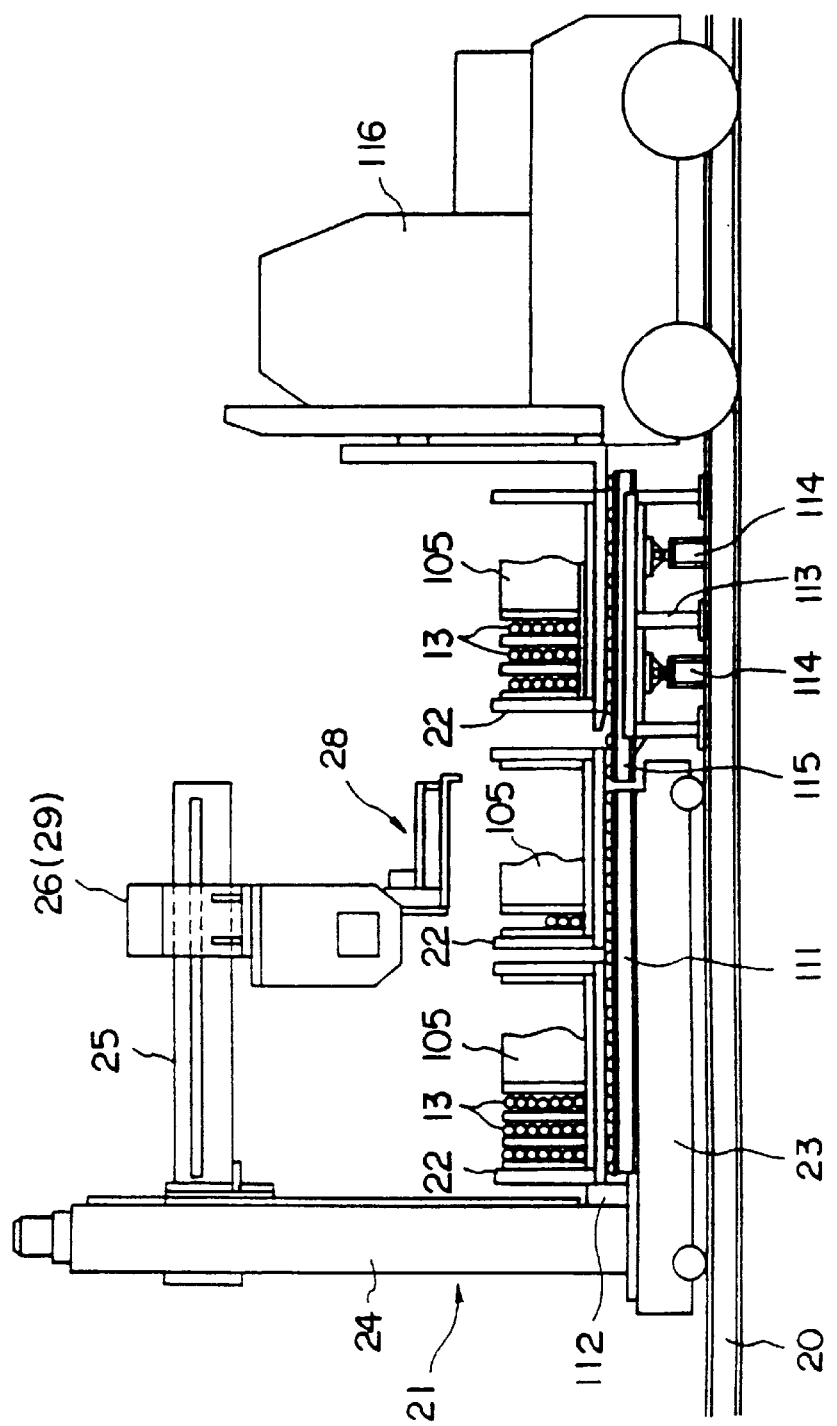
FIG. 14 is a side elevational view showing a conveyer used by the embodiment according to the method of the present invention.

Next, how the packing case 22 is conveyed will be described with reference to FIG. 14. FIG. 14 is a side elevational view showing that the packing case 22 is conveyed using a conveyer.

As shown in FIG. 14, the conveyer 111 and a stopper 112 are provided with the placing table 23 of the L-shaped frames 21 where the packing cases 22 are processed and a second conveyer 115, which has a receiving table 113 and hydraulic mechanisms 114 and can be moved upward and downward, is disposed in the vicinity of the placing table 23.

According to the above method, the packing cases 22 are placed on the conveyers 111 and 115 by a forklift 116 and the conveyers 111 and 115 are driven, so that the packing cases 22 can be introduced into the apparatus and positioned in the state that the lids 101 of the packing cases 22 are removed in an external setup, thus a setup time can be reduced. Further, since the packing cases 22 are introduced onto and removed from the placing table 23 using the conveyers, they need not be conveyed by a crane. Thus, the tubes can be assembled without being affected by other jobs.

Figure 15:
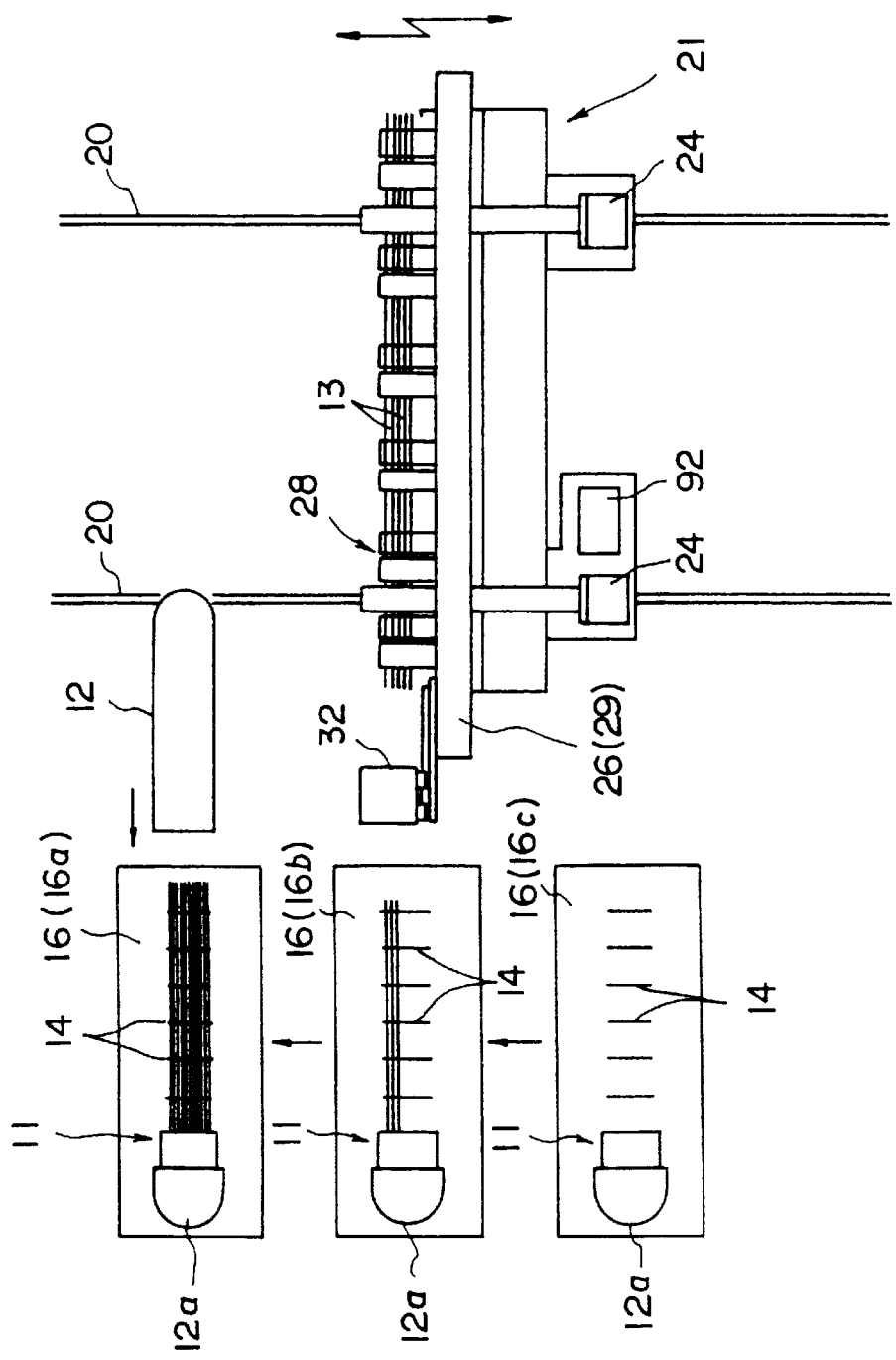
FIG. 15 is a plan view showing the disposition of an apparatus showing the embodiment according to the method of the present invention.

Next, a method of executing jobs in parallel with each other or sequentially will be described with reference to FIG. 15. FIG. 15 is a plan view showing the disposition of the apparatus.

As shown in FIG. 15, according to the tube assembling method of the embodiment, the partitions 14 for a plurality of the heat exchangers 11 are disposed in parallel with each other and the tubes are assembled to the partitions 14 for the respective heat exchangers by parallel jobs or sequential jobs. That is, the partitions 14 which are intended to be assembled are placed on a plurality of, for example, three sets of the horizontally movable working trucks 16 and set up in parallel with each other. Since the tubes on the working truck 16 (16a) shown at the uppermost portion in FIG. 15 have been assembled thereon, the cylindrical frame 12 can be welded and fixed to the feed water heater 11 at the position where the tube assembly job has been executed. As shown at the intermediate portion in FIG. 15, the next tube assembly job can be executed at once on the working truck 16 (16b) which is located adjacent to the working truck 16a. Further, the working truck 16 (16c) shown at the lowermost portion in FIG. 15 can be caused to wait for the assembly of the tubes which will be executed thereafter. According to the above method, the use of the plurality of working trucks 16a, 16b and 16c permits the jobs to be executed in parallel with each other or sequentially, by which a setup time can be reduced when workpieces are changed.

Figure 16:
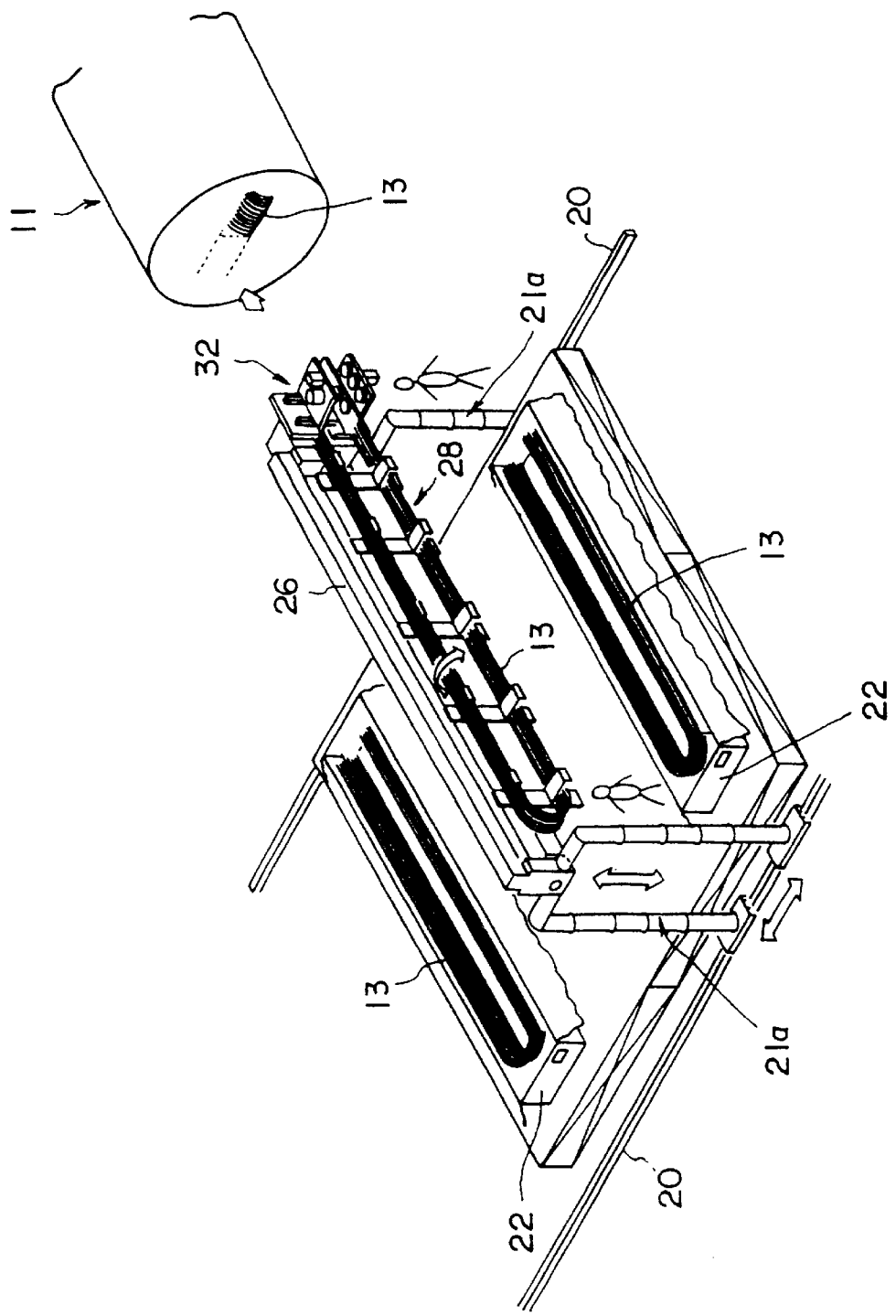
FIG. 16 is a perspective view showing an apparatus of another embodiment of the present invention.

Note, although the L-shaped frames 21 are used as the base of the apparatus in the above embodiment, this is an example of a best mode and portal frames may be used in some cases. FIG. 16 is a schematic perspective view showing the arrangement of the apparatus to which the portal frames are applied.

Figure 17:
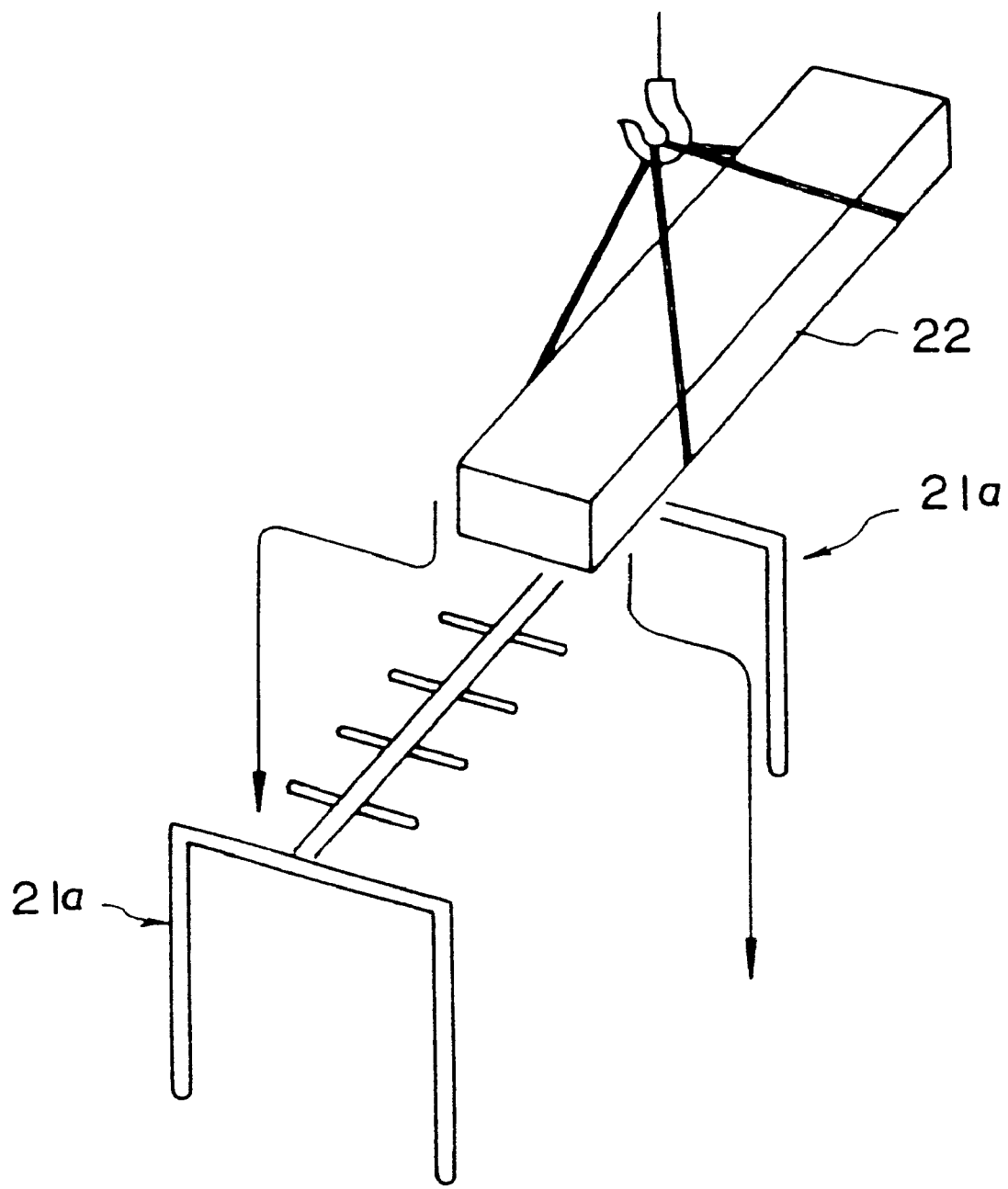
FIG. 17 is a view explaining the apparatus shown in FIG. 16.

In this example, the taking-out portion support arm 26 is mounted on portal frames 21a which confront each other and mechanisms similar to those of the above embodiment are assembled to the taking-out portion support arm 26. This arrangement can also increases efficiency as compared with prior art. In this example, however, workability is lowered due to the relationship between the mechanisms and a place where the packing case 22 is disposed, which will be described by comparing simplified explanatory views shown in FIG. 17 and FIG. 18. When the portal frames 21a shown in FIG. 17 are employed, a large space is required because the distance between the portals 21a must be larger than the maximum length of the packing case 22 and further the frames 21a disturb the setup of the packing case 22. Whereas, since the cantilever L-shaped frames 21 shown in FIG. 18 can widely use a space, the longitudinal direction and the lateral direction of the packing case 22 can be released.

Although the above embodiment describes the assembly of the U-shaped tubes 13, the present invention is not limited thereto but can assemble linear heat exchanging tubes using the tube grasping means 28, the tube positioning means 29, the tube taking-out means 30 and the portion of the tube feed means 32 which processes a side of the U-shaped tube 13 in the tube assembling apparatus.

As described above in detail with reference to the preferred embodiments, according to the present invention, the tube inserting job which has been conventional carried out by workers can be automatically executed by the tube assembling apparatus. Accordingly, there can be achieved such advantages that tubes can be continuously and automatically inserted by the automatic control which is executed by the memory of a tube inserting position on a coordinate, as well as since the tubes can be taken out from the packing cases without using a crane, the working time required can be reduced. There can be also achieved such advantages that the working space can be reduced as well as since the air actuators are employed as the operation drive sources for operating the portions which come into contact with the tubes, quality and enhanced safety can be simultaneously secured and further the space for the packing cases can be reduced by the novel tube inserting method.

It is to be noted that the present invention is not limited to the described embodiment and many other changes and modifications may be made without departing from the scopes of the appended claims.

What is claimed is:

1. A heat exchanging tube feed apparatus for a heat exchanger for taking out one by one a plurality of heat exchanging tubes each having a U-shape in outer appearance and arranged in parallel with each other and feeding the tubes in one direction, said heat exchanging tube feed apparatus comprising:

push means for pushing out the heat exchanging tubes;
   a push-out cylinder for driving the push means;
   a grooved roller supporting one tube positioned to a lower side of the tubes from a lower side thereof;
   a link mechanism supporting the grooved roller; and
   cylinder means for driving the link mechanism vertically and horizontally and taking out sideways the tube supported by the grooved roller, wherein said grooved roller and said link mechanism are supported so as to be rotatable by a shaft at a tube take-out position, and when a U-shaped curved portion of the U-shaped tube passes at a time of tube insertion, the grooved roller and the link mechanism are opened so as to escape in a tube inserting direction through the shaft.

2. A heat exchanging tube feed apparatus for a heat exchanger for taking out one by one a plurality of heat exchanging tubes each having a U-shape in an outer appearance and arranged in parallel with each other and feeding the tubes in one direction, comprising:

push means for pushing out the heat exchanging tubes;

a push-out cylinder for driving the push means for pushing out the heat exchanging tubes;

a grooved roller supporting one tube positioned to a lower side of the tubes from a lower side thereof;

a link mechanism supporting the grooved roller; and cylinder means for driving the link mechanism vertically and horizontally and taking out sideways the tube supported by the grooved roller, wherein said grooved roller for supporting the tube from the lower side thereof and said link mechanism for supporting the grooved roller are supported so as to be rotatable by a shaft at a tube taking-out position and usually disposed at the tube taking-out position by a spring and when a U-shaped curved portion of the U-shaped tube passes at the tube insertion time, said grooved roller and said link mechanism are operated to escape in a tube inserting direction through the shaft.

* * * * *